(12) United States Patent
Sakai et al.

(10) Patent No.: US 8,334,667 B2
(45) Date of Patent: Dec. 18, 2012

(54) PERMANENT MAGNET ROTATING ELECTRICAL MACHINE AND PERMANENT MAGNET MOTOR DRIVE SYSTEM

(75) Inventors: Kazuto Sakai, Yokosuka (JP); Kazuaki Yuuki, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 336 days.

(21) Appl. No.: 12/593,146

(22) PCT Filed: Dec. 7, 2007

(86) PCT No.: PCT/JP2007/073647
§ 371 (c)(1),
(2), (4) Date: Sep. 25, 2009

(87) PCT Pub. No.: WO2008/117497
PCT Pub. Date: Oct. 2, 2008

(65) Prior Publication Data
US 2010/0060223 A1    Mar. 11, 2010

(30) Foreign Application Priority Data
Mar. 26, 2007 (JP) .................................. 2007-079327

(51) Int. Cl.
*H02P 3/04* (2006.01)
(52) U.S. Cl. .............. 318/494; 318/779; 310/156.53; 310/156.56; 310/216.074; 310/156.58; 29/426.5; 29/596; 252/62.55; 148/301
(58) Field of Classification Search .......... 318/494, 318/779; 310/156.53, 261, 156.56, 156.03, 310/156.55, 216.074, 156.07, 262, 90.05, 310/61, 216.104, 114, 166, 156.43, 156.58; 417/410.1, 423.1; 29/426.5, 596; 148/301; 252/62.55
See application file for complete search history.

(56) References Cited

U.S. PATENT DOCUMENTS
5,689,166 A * 11/1997 Nagayama et al. ........... 318/721
(Continued)

FOREIGN PATENT DOCUMENTS
DE         3334149 A1 *   4/1985
(Continued)

OTHER PUBLICATIONS

Tapia et al. "Electric Machines and Drives Conference, 2001. IEMDC 2001. IEEE International", Issue Date: 2001, pp. 126-131, Meeting Date: Jun. 17, 2001-Jun. 20, 2001.*

(Continued)

*Primary Examiner* — Bentsu Ro
*Assistant Examiner* — Jorge Carrasquillo
(74) *Attorney, Agent, or Firm* — Oblon, Spivak, McClelland, Maier & Neustadt, L.L.P.

(57) ABSTRACT

A permanent magnet rotating electrical machine capable of conducting a variable speed operation at high output in a wide range from low speed to high speed and improving efficiency and reliability in a wide operating range. Two kinds of permanent magnets having different shapes or different magnetic characteristics are embedded in a rotor core, to form a magnetic pole. The permanent magnets arranged at the magnetic pole include a permanent magnet whose product of coercive force and thickness along a magnetizing direction is small and a permanent magnet whose product of coercive force and thickness along the magnetizing direction is large. A magnetic field created by passing a current to an armature coil for a short time is used to irreversibly magnetize the permanent magnet whose product of coercive force and thickness along magnetizing direction is small, thereby changing a total linkage flux amount, and a positive d-axis current is passed when torque is large.

9 Claims, 17 Drawing Sheets

U.S. PATENT DOCUMENTS

| | | | |
|---|---|---|---|
| 5,698,823 A * | 12/1997 | Tanahashi | 187/296 |
| 5,808,392 A * | 9/1998 | Sakai et al. | 310/214 |
| 6,087,751 A * | 7/2000 | Sakai | 310/156.56 |
| 6,800,977 B1 | 10/2004 | Ostovic | |
| 7,622,883 B2 * | 11/2009 | Kaizuka et al. | 318/730 |
| 2004/0100221 A1 * | 5/2004 | Fu | 318/700 |
| 2004/0145263 A1 * | 7/2004 | Kojima et al. | 310/156.23 |
| 2004/0150233 A1 * | 8/2004 | Kajiura | 290/24 |
| 2005/0174004 A1 | 8/2005 | Takehara et al. | |

FOREIGN PATENT DOCUMENTS

| | | |
|---|---|---|
| JP | 60 87686 | 5/1985 |
| JP | 7 336919 | 12/1995 |
| JP | 9-233845 | 9/1997 |
| JP | 11 27913 | 1/1999 |
| JP | 11 136912 | 5/1999 |
| JP | 2003-339197 A | 11/2003 |
| JP | 2004 128101 | 4/2004 |
| JP | 2006-230174 A | 8/2006 |
| JP | 2006 280195 | 10/2006 |
| JP | 2006280195 A * | 10/2006 |
| JP | 2007-525137 A | 8/2007 |
| WO | 2006/118219 A | 11/2006 |

OTHER PUBLICATIONS

Takeda, Yoji et al., "Design and Control of Interior Permanent Magnet Synchronous Motor", Ohmsha Publishing, pp. 1-8, Oct. 25, 2001, (with English translation).

Weschta, A. et al., "Schwaechung des Erregerfelds bei einer Dauermagneterregten Synchronmaschine", Etzarchiv, vol. 7, No. 3, pp. 79-84, 1985, (with English abstract).

Office Action issued Jan. 12, 2011 in China Application No. 200780052311.0 (With English Translation).

Japanese Office Action mailed on May 29, 2012, issued for JP Application No. 2007-079327, filed on Mar. 26, 2007 (with English translation).

Notification of the Third Official Action mailed Jul. 30, 2012 in Chinese Patent Application No. 200780052311.0 (with English Translation).

* cited by examiner

PERMANENT MAGNET ROTATING ELECTRICAL MACHINE AND PERMANENT MAGNET MOTOR DRIVE SYSTEM

TECHNICAL FIELD

The present invention relates to a permanent magnet rotating electrical machine and a permanent magnet motor drive system.

BACKGROUND TECHNOLOGY

Generally, permanent magnet rotating electrical machines are classified into two types. One is a surface-permanent magnet rotating electrical machine having permanent magnets adhered to an outer circumferential face of a rotor core and the other is an interior permanent magnet rotating electrical machine having permanent magnets embedded in a rotor core. For a variable-speed drive motor, the interior permanent magnet rotating electrical machine is appropriate.

With reference to FIG. 20, a configuration of a conventional interior permanent magnet rotating electrical machine will be explained. Along an outer circumference of a rotor core 2 of a rotor 1, rectangular hollows are arranged at regular intervals, the number of the rectangular hollows being equal to the number of poles. In FIG. 20, the rotor 1 has four poles, and therefore, four hollows are arranged to receive permanent magnets 4, respectively. Each permanent magnet 4 is magnetized in a radial direction of the rotor 1, i.e., in a direction orthogonal to a side (long side in FIG. 20) of the rectangular section of the permanent magnet 4 that faces an air gap. The permanent magnet 4 is usually an NdFeB permanent magnet having a high coercive force so that it is not demagnetized with a load current. The rotor core 2 is formed by laminating electromagnetic sheets through which the hollows are punched. The rotor 1 is incorporated in a stator 20. The stator 20 has an armature coil 21 that is received in a slot formed inside a stator iron core 22. An inner circumferential face of the stator 20 and an outer circumferential face of the rotor 1 face each other with the air gap 23 interposing between them.

Known examples of such a permanent magnet rotating electrical machine are described in "Design and Control of Interior Permanent Magnet Synchronous Motor," Takeda Yoji, et al., a document of Ohm-sha Publishing (Non-patent Document 1) and Japanese Unexamined Patent Application Publication No. H07-336919 (Patent Document 1). An example of a high-output rotating electrical machine having an excellent variable-speed characteristic is a permanent magnet reluctance motor. Examples thereof are described in Japanese Unexamined Patent Application Publication No. H11-27913 (Patent Document 2) and Japanese Unexamined Patent Application Publication No. H11-136912 (Patent Document 3). Further, there is an interior permanent magnet motor employing alnico magnets whose magnetic force is changed. Examples thereof are described in U.S. Pat. No. 6,800,977 (Patent Document 4) and Weschta, "Schachung des Erregerfelds bei einer dauermagneterregten Synchronmaschine", ETZ Archiv Vol. 7, No. 3, pp. 79-84 (1985) (Non-patent Document 2).

The rotating electrical machine of the Non-patent Document 2 is a permanent magnet motor employing alnico magnets whose flux amount is changed. This related art may demagnetize the alnico magnets but it hardly magnetizes the alnico magnets to an original magnetized state. The rotating electrical machine mentioned in the Patent Document 4 is a flux-concentration-type interior permanent magnet motor employing alnico permanent magnets. This rotating electrical machine is a modification of the rotating electrical machine described in the Non-patent Document 2, and like the rotating electrical machine of the Non-patent Document 2, applies a magnetic field to change the flux amount of the alnico magnets. The rotating electrical machine of the Patent Document 4 is a simple alnico magnet motor, and therefore, its output is insufficient. When torque is produced, the alnico magnets are demagnetized by a load current, to decrease the torque. To generate sufficient torque with the alnico magnets whose energy product is small, the alnico magnets must be thick in a magnetizing direction. To magnetize such thick alnico magnets, a very large current must be passed. Then, it will be difficult to magnetize the permanent magnets, or change the flux amount of the permanent magnets.

In the permanent magnet rotating electrical machine, a permanent magnet always generates constant linkage flux to increase a voltage induced by the permanent magnet in proportion to a rotation speed. Accordingly, when a variable-speed operation is carried out from low speed to high speed, the voltage (counter electromotive voltage) induced by the permanent magnet becomes very high at high rotation speed. The voltage induced by the permanent magnet is applied to electronic parts of an inverter, and if the applied voltage exceeds a withstand voltage of the electronic parts, the parts will cause insulation breakage. It is necessary, therefore, to design the machine so that the flux amount of the permanent magnet is below the withstand voltage. Such a design, however, lowers the output and efficiency of the permanent magnet rotating electrical machine in a low-speed zone.

If the variable-speed operation is carried out in such a way as to provide nearly a constant output from low speed to high speed, the voltage of the rotating electrical machine will reach an upper limit of a power source voltage in a high rotation speed zone, not to pass a current necessary for output because the linkage flux of the permanent magnet is constant. This greatly drops output in the high rotation speed zone and the variable-speed operation will not be carried out in a wide range up to high rotation speed.

Recent techniques of expanding a variable-speed range employ flux-weakening control such as one described in the Non-patent Document 1. The total linkage flux amount of an armature coil is the sum of flux by a d-axis current and flux by a permanent magnet. The flux-weakening control generates flux with a negative d-axis current to reduce the total linkage flux amount. The flux-weakening control makes a permanent magnet of high coercive force operate in a reversible range on a magnetic characteristic curve (B-H characteristic curve). For this, the permanent magnet must be an NdFeB magnet having a high coercive force so that it may not irreversibly demagnetized with a demagnetizing field produced by the flux-weakening control.

In the flux-weakening control, flux produced by a negative d-axis current reduces linkage flux and a reduced portion of the linkage flux produces a voltage margin for an upper voltage limit. This makes it possible to increase a current for a torque component, thereby increasing an output in a high-speed zone. In addition, the voltage margin makes it possible to increase a rotation speed, thereby expanding a variable-speed operating range.

Always passing a negative d-axis current that contributes nothing to an output, however, increases a copper loss to deteriorate efficiency. In addition, a demagnetizing field produced by the negative d-axis current generates harmonic flux that causes a voltage increase. Such a voltage increase limits a voltage reduction achieved by the flux-weakening control. These factors make it difficult for the flux-weakening control to conduct a variable-speed operation for the interior permanent magnet rotating electrical machine at speeds over three times a base speed. In addition, the harmonic flux increases an iron loss to drastically reduce efficiency in middle- and high-speed zones. Further, the harmonic flux generates an electromagnetic force that produces vibration.

When the interior permanent magnet motor is employed as a drive motor of a hybrid car, the motor rotates together with an engine when only the engine is used to drive the hybrid car. In this case, a voltage induced by permanent magnets of the motor increases at middle or high rotation speed. To suppress an increase in the induced voltage below a power source voltage, the flux-weakening control continuously passes a negative d-axis current. The motor in this state produces only a loss to deteriorate an overall operating efficiency.

When the interior permanent magnet motor is employed as a drive motor of an electric train, the electric train sometimes carries out a coasting operation. Then, like the above-mentioned example, the flux-weakening control is carried out to continuously pass a negative d-axis current to suppress a voltage induced by permanent magnets below a power source voltage. The motor in this state only produces a loss to deteriorate an overall operating efficiency.

A technique to solve these problems is disclosed in Japanese Unexamined Patent Application Publication No. 2006-280195 (Patent Document 5). The technique described in the Patent Document 5 relates to a permanent magnet rotating electrical machine capable of conducting a variable-speed operation in a wide range from low speed to high speed and improving efficiency and reliability. This machine includes a stator provided with a stator coil and a rotor having a low-coercive-force permanent magnet whose coercive force is of such a level that a magnetic field created by a current of the stator coil may irreversibly change the flux density of the magnet and a high-coercive-force permanent magnet whose coercive force is equal to or larger than twice that of the low-coercive-force permanent magnet. In a high rotation speed zone in which the voltage of the machine exceeds a maximum power source voltage, a current is passed to create a magnetic field that magnetizes the low-coercive-force permanent magnet in such a way as to reduce total linkage flux produced by the low-coercive-force and high-coercive-force permanent magnets, thereby adjusting a total linkage flux amount.

Patent Document 1: Japanese Unexamined Patent Application Publication No. H07-336919
Patent Document 2: Japanese Unexamined Patent Application Publication No. H11-27913
Patent Document 3: Japanese Unexamined Patent Application Publication No. H11-136912
Patent Document 4: U.S. Pat. No. 6,800,977
Patent Document 5: Japanese Unexamined Patent Application Publication No. 2006-280195
Non-patent Document 1: "Design and Control of Interior Permanent Magnet Synchronous Motor," Takeda Yoji, et al., Ohm-sha Publishing
Non-patent Document 2: Weschta, "Schachung des Erregerfelds bei einer dauermagneterregten Synchronmaschine", ETZ Archiv Vol. 7, No. 3, pp. 79-84 (1985)

DISCLOSURE OF INVENTION

An object of the present invention is to provide a permanent magnet motor drive system that passes a positive d-axis current when passing a q-axis current to generate torque in a conventional permanent magnet rotating electrical machine having a low-coercive-force permanent magnet and high-coercive-force permanent magnet at a magnetic pole. The system is capable of conducting a variable speed operation in a wider range and realizing high torque. Another object is to provide a permanent magnet rotating electrical machine having a structure optimally applicable to the permanent magnet motor drive system.

An aspect of the present invention provides a permanent magnet motor drive system having a permanent magnet motor employing permanent magnets, an inverter to drive the permanent magnet motor, and a magnetize means to pass a magnetizing current for controlling flux of the permanent magnets. The permanent magnet motor employs two or more kinds of permanent magnets having different shapes or magnetic characteristics, to form each magnetic pole. A plurality of the magnetic poles form a rotor. The magnetize means passes for a short time a d-axis current through an armature coil of the permanent magnet motor, to generate a magnetic field to magnetize at least a permanent magnet of one kind at each magnetic pole and irreversibly change a flux amount of the permanent magnet and changes a current phase of an armature coil current, to pass a magnetizing current.

In the permanent magnet motor drive system of the above-mentioned invention, the magnetize means passes for a short time a d-axis current of the armature coil of the permanent magnet motor, to generate a magnetic field to magnetize at least a permanent magnet of one kind at each magnetic pole and irreversibly change a flux amount of the permanent magnet and passes a positive d-axis current to the armature coil when torque is generated.

Another aspect of the present invention provides a permanent magnet rotating electrical machine including two or more kinds of permanent magnets having different shapes or magnetic characteristics, to form a magnetic pole, a rotor formed with a plurality of the magnetic poles, and an armature arranged along an outer circumference of the rotor with an air gap interposing between them. The permanent magnets that form the magnetic pole include a permanent magnet whose product of coercive force and thickness along magnetizing direction differs from that of another permanent magnet.

The permanent magnet motor drive system according to the present invention is capable of conducting a variable speed operation in a wide range from low speed to high speed, realizing high torque in a low rotation speed zone and high output in middle and high rotation speed zones, improving efficiency, reliability, and productivity, and reducing materials and rare materials.

The permanent magnet rotating electrical machine, according to the present invention is optimally applicable to the above-mentioned permanent magnet motor drive system.

BEST MODE OF IMPLEMENTING INVENTION

The embodiments of the present invention will be explained in detail with reference to the drawings. Although each of the below-mentioned embodiments exemplarily shows a four-pole permanent magnet rotating electrical machine, any other number of poles is adoptable.

First Embodiment

[Permanent Magnet Rotating Electrical Machine]

Figure 1:
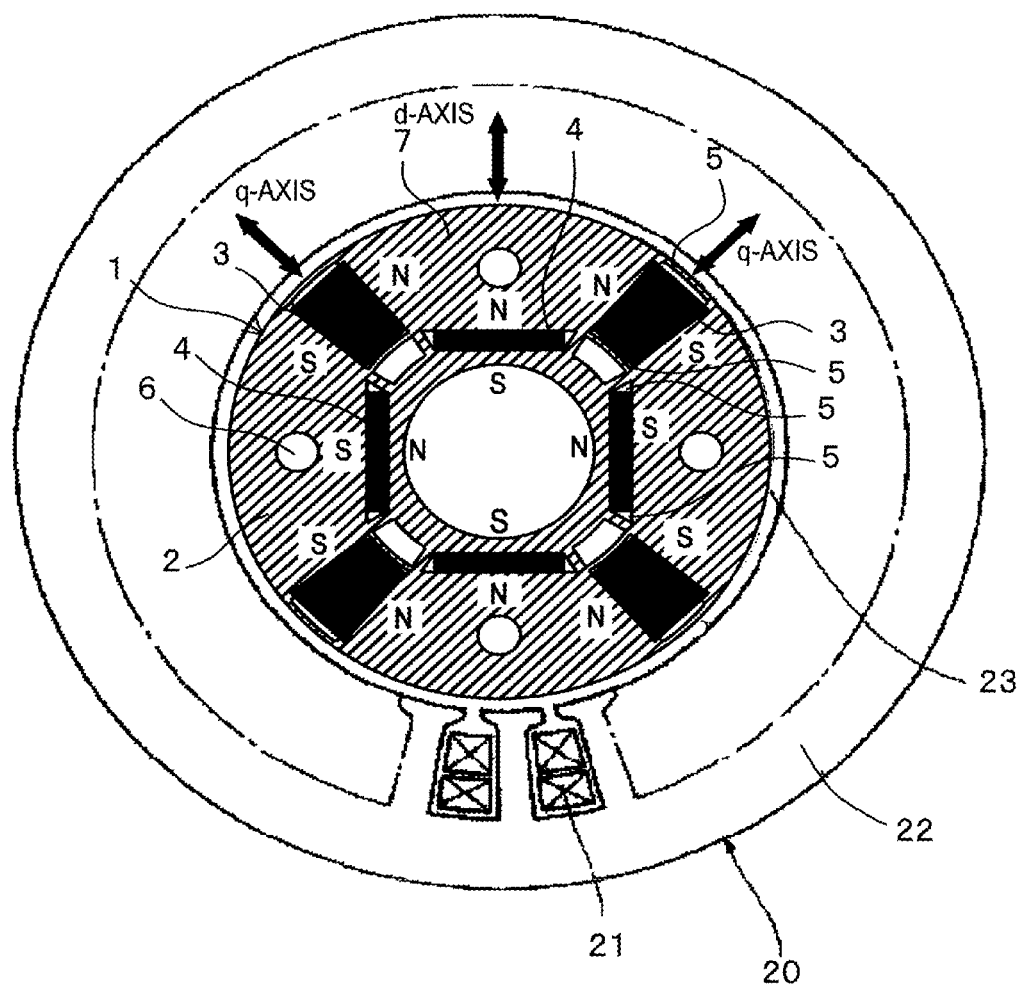
FIG. 1 is a sectional view of a permanent magnet rotating electrical machine according to a first embodiment of the present invention.
Figure 20:
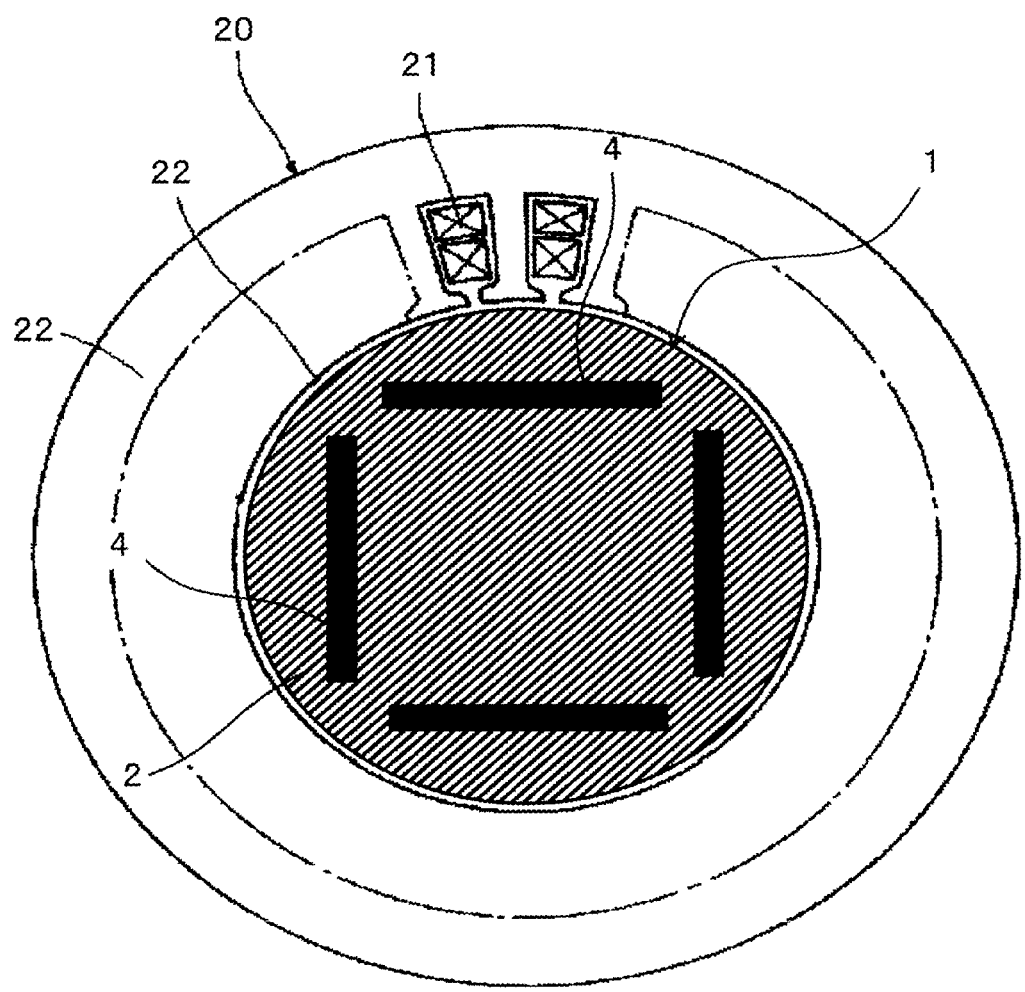
FIG. 20 is a sectional view of a conventional interior permanent magnet motor.

With reference to FIGS. 1 to 6, the permanent magnet rotating electrical machine according to the first embodiment of the present invention will be explained. FIG. 1 illustrates a structure of the permanent magnet rotating electrical machine according to the embodiment. Inside a stator 20, a rotor 1 is accommodated to face the stator 20 with an air gap 23 interposing between them. The stator 20 is a conventional one and is similar to that illustrated in FIG. 20.

As illustrated in FIG. 1, the rotor 1 in the permanent magnet rotating electrical machine according to the embodiment includes a rotor core 2, permanent magnets 3 whose product of coercive force and thickness along magnetizing direction is small, and permanent magnets 4 whose product of coercive force and thickness along magnetizing direction is large. The rotor core 2 is constituted by laminating silicon steel plates. The permanent magnet 3 whose product of coercive force and thickness along magnetizing direction is small is an alnico magnet and four pieces thereof are embedded in diametrical sections of the rotor core 2. The permanent magnet 3 whose product of coercive force and thickness along magnetizing direction is small may be an FeCrCo magnet. The permanent magnet 4 whose product of coercive force and thickness along magnetizing direction is large is an NdFeB magnet and four pieces thereof are embedded in diametrical sections of the rotor core 2.

The permanent magnet 3 made of an alnico magnet is arranged substantially along the diameter of the rotor 1 and a cross section thereof is trapezoidal. A magnetizing direction of the permanent magnet 3 is substantially circumferential and an average thickness along magnetizing direction thereof is 6 mm according to the embodiment (although the thickness is dependent on specifications). The permanent magnet 4 made of an NdFeB magnet is substantially arranged in a circumferential direction and has a rectangular cross-sectional shape. A magnetizing direction of the permanent magnet 4 is substantially diametrical and a thickness along magnetizing direction thereof is 2 mm according to the embodiment.

Figure 2:
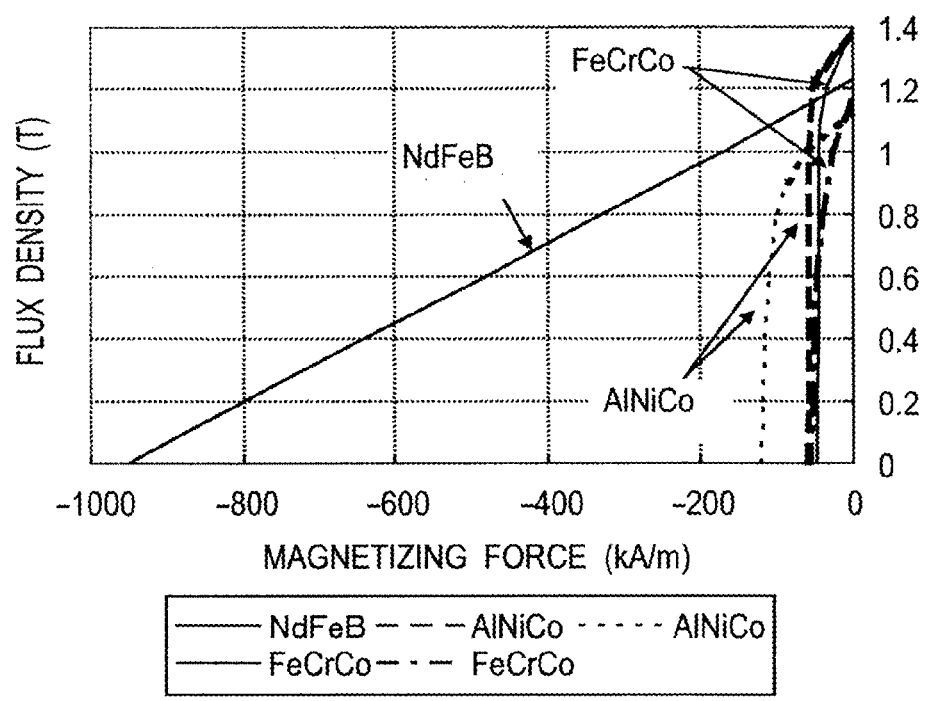
FIG. 2 is a graph of magnetic characteristics of low-coercive-force permanent magnets and high-coercive-force permanent magnets adopted as permanent magnets of a rotor of the above-mentioned embodiment.

FIG. 2 illustrates the magnetic characteristics of an alnico (AlNiCo) magnet used for the permanent magnet 3 of the embodiment, an FeCrCo magnet, and an NdFeB magnet used for the permanent magnet 4. A coercive force (a magnetic field where a flux density becomes zero) of the alnico magnet is 60 to 120 kA/m and is 1/15 to 1/8 of a coercive force of 950 kA/m of the NdFeB magnet. A coercive force of the FeCrCo magnet is about 60 kA/m which is 1/15 of the coercive force of 950 kA/m of the NdFeB magnet. It is understood that the alnico magnet and FeCrCo magnet each have a coercive force fairly lower than the NdFeB magnet.

Magnetization of the permanent magnets according to the embodiment will be explained. In connection with the NdFeB permanent magnets 4 on a d-axis magnetic circuit, flux by a d-axis current passes between two NdFeB permanent magnets 4 (two adjacent NdFeB permanent magnets 4 having different poles), and therefore, a magnetic field by the d-axis current acts on one NdFeB permanent magnet 4 per pole. In connection with the alnico permanent magnets 3, the flux by the d-axis current passes through one alnico permanent magnet 3 between magnetic poles, and therefore, the magnetic field by the d-axis current acts on 1/2 of the NdFeB permanent magnet 4 per pole. When evaluating characteristics on a magnetic circuit for one pole, the thickness along magnetizing direction of the alnico permanent magnet 3 is considered as ½ of the actual size thereof.

According to the embodiment, the permanent magnet 3 whose product of coercive force and thickness along magnetizing direction is small is an alnico magnet having a coercive force of 120 kA/m. According to the embodiment, the alnico magnet has the product of coercive force and thickness along magnetizing direction of 120 kA/m×(6×10$^{-3}$/2) m=360 A. The permanent magnet 4 whose product of coercive force and thickness along magnetizing direction is large is an NdFeB magnet having a coercive force of 1000 kA/m. According to the embodiment, the NdFeB magnet has the product of coercive force and thickness along magnetizing direction of 1000 kA/m×(2×10$^{-3}$) m=2000 A. According to the embodiment, the product of coercive force and thickness along magnetizing direction of the NdFeB permanent magnet 4 is 5.6 times as large as that of the alnico permanent magnet 3.

As illustrated in FIG. 1, each low-coercive-force alnico permanent magnet 3 is embedded in the rotor core 2. Each end of the alnico permanent magnet 3 is provided with a hollow 5. The alnico permanent magnet 3 is arranged in a radial direction of the rotor 1 along a q-axis serving as a center axis of an inter-pole part. An axis of easy magnetization of the alnico permanent magnet 3 is substantially a circumferential direction, i.e., a direction orthogonal to the radius of the rotor 1 (in FIG. 1, a direction orthogonal to a line that halves the trapezoidal section of the alnico permanent magnet 3 and passes through the rotation center).

The high-coercive-force NdFeB permanent magnet 4 is also embedded in the rotor core 2 and each end thereof is provided with a hollow 5. The NdFeB permanent magnets 4 are substantially arranged in a circumferential direction of the rotor 1 such that each NdFeB permanent magnet 4 is arranged between two alnico permanent magnets 3 on the inner circumferential side of the rotor 1. An axis of easy magnetization of the NdFeB permanent magnet 4 is substantially orthogonal to the circumferential direction of the rotor 1 (in FIG. 1, a direction orthogonal to a long side of the rectangular section of the NdFeB permanent magnet 4).

Each magnetic pole portion 7 of the rotor core 2 is surrounded by two adjacent alnico permanent magnets 3 and one NdFeB permanent magnet 4. As illustrated in FIGS. 1 and 3 to 6, a center axis of the magnetic pole portion 7 of the rotor core 2 is on the d-axis and a center axis between magnetic poles is on the q-axis. Accordingly, the alnico permanent magnet 3 is arranged along the q-axis, i.e., the center axis between magnetic poles and is magnetized in a direction that forms 90° or −90° with respect to the q-axis. Concerning the adjacent alnico permanent magnets 3, polar faces that face each other have the same polarity.

The NdFeB permanent magnet 4 is arranged in a direction orthogonal to the d-axis, i.e., orthogonal to the center axis of the magnetic pole portion 7 and is magnetized in a direction that forms 0° or 180° with respect to the d-axis. The adjacent NdFeB permanent magnets 4 are oppositely polarized.

[Permanent Magnet Motor Drive System]

Figure 7:
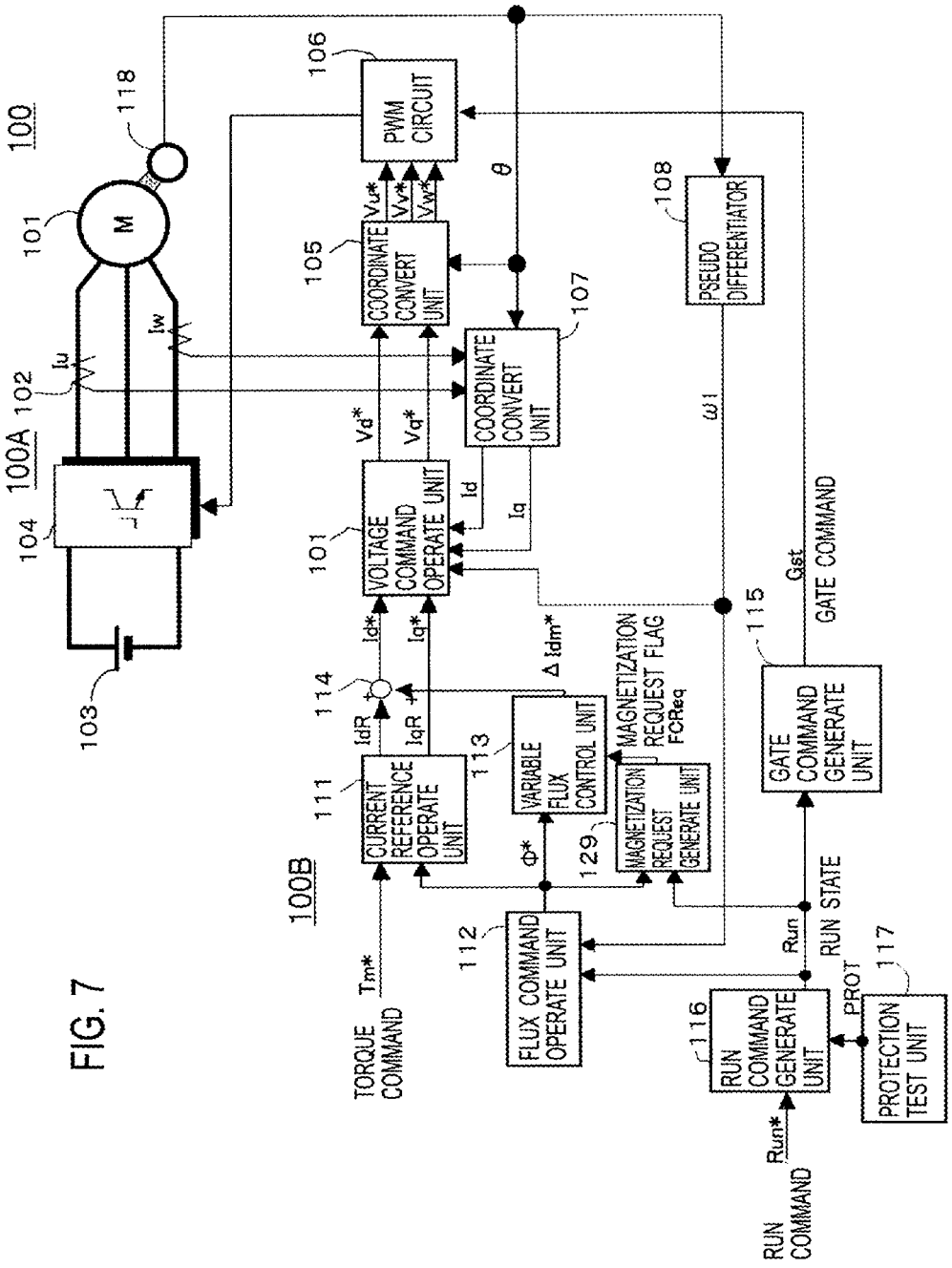
FIG. 7 is a block diagram of a permanent magnet motor drive system according to the first embodiment of the present invention.
Figure 8:
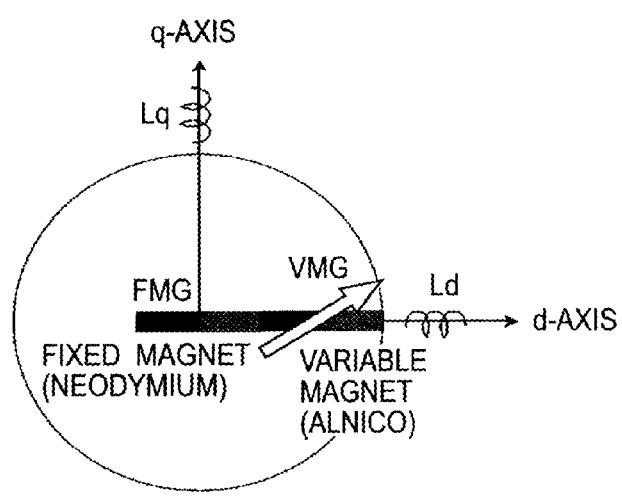
FIG. 8 is a simplified model view of a variable flux permanent magnet motor.

FIG. 7 is a control block diagram illustrating a permanent magnet motor drive system 100 for rotating and driving the permanent magnet rotating electrical machine according to the first embodiment of the present invention as a motor. Before explaining the block diagram, a variable flux motor as a permanent magnet synchronous motor (PM motor) will be explained. FIG. 8 illustrates an image of the variable flux motor 101. A stator side thereof is similar to that of a conventional motor. A rotor side thereof has, as permanent magnets, a fixed magnet FMG whose magnetic material has a fixed flux density and a variable magnet VMG whose magnetic material has a variable flux density. The conventional PM motor has only the former fixed magnet FMG. The variable flux motor 101 is characterized in that it has the variable magnet VMG.

Here, the fixed magnet and variable magnet will be explained. A permanent magnet keeps a magnetized state without an external current passed thereto. It is not always true even for the fixed magnet that the flux density thereof is always unchanged under any condition. Even the conventional PM motor is demagnetized or magnetized when receiving an excessive current from an inverter. Namely, the permanent magnet is not a magnet whose flux amount is unchanged, but is a magnet whose flux density is almost unchanged irrespective of a current supplied by, for example, an inverter if normally operated under rated conditions. On the other hand, the variable magnet is a magnet whose flux density changes depending on a current passed from an inverter even under the above-mentioned operating conditions.

The variable magnet VMG of this sort can be designed within a certain range according to the material and structure of the magnet. For example, recent PM motors frequently employ neodymium (NdFeB) magnets having a high residual flux density Br. The residual flux density Br of this magnet is high, for example, about 1.2 T, and therefore, large torque can be output from a small apparatus. Such a magnet is preferable for a hybrid vehicle (HEV) and an electric train that need a high-output, small-sized motor. The conventional PM motor needs not to be demagnetized by normal current, and therefore, a neodymium magnet (NdFeB) having a very high coercive force Hc of about 1000 kA/m is an optimum magnetic material for the PM motor. For the PM motor, magnets having a large residual flux density and coercive force are chosen.

For the variable magnet, a magnetic material such as AlNiCo (Hc=60 to 120 kA/m) or FeCrCo (Hc=about 60 kA/m) having a high residual flux density and a small coercive force may be used. With respect to a standard current amount (a current amount passed from an inverter to drive a conventional PM motor), the flux density (flux amount) of the neodymium magnet is substantially constant, and the flux density (flux amount) of the variable magnet VMG such as an AlNiCo, magnet varies. Strictly speaking, the neodymium magnet serving as the fixed magnet FMG is used in a reversible zone, and therefore, the flux density thereof may vary in a very small range. It, however, restores an original value if an inverter current stops. On the other hand, the variable magnet VMG uses up to a nonreversible zone, and therefore, does not restore an original value even after an inverter current stops. In FIG. 8, the flux quantity of the alnico magnet serving as the variable magnet VMG changes in the d-axis direction and is substantially zero in the Q-axis direction.

Figure 9:
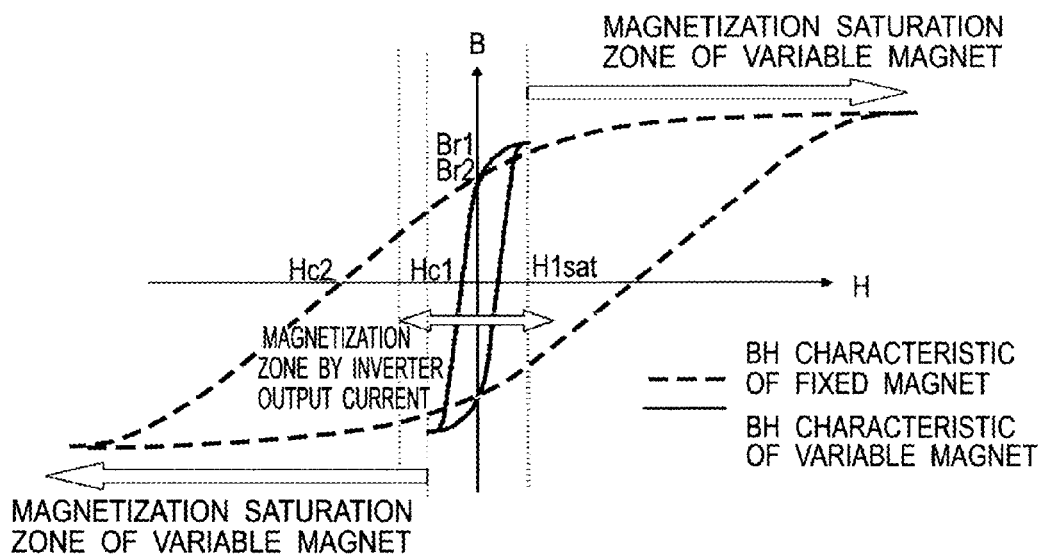
FIG. 9 is a BH characteristic diagram of the permanent magnet rotating electrical machine according to the above-mentioned embodiment.
Figure 10:
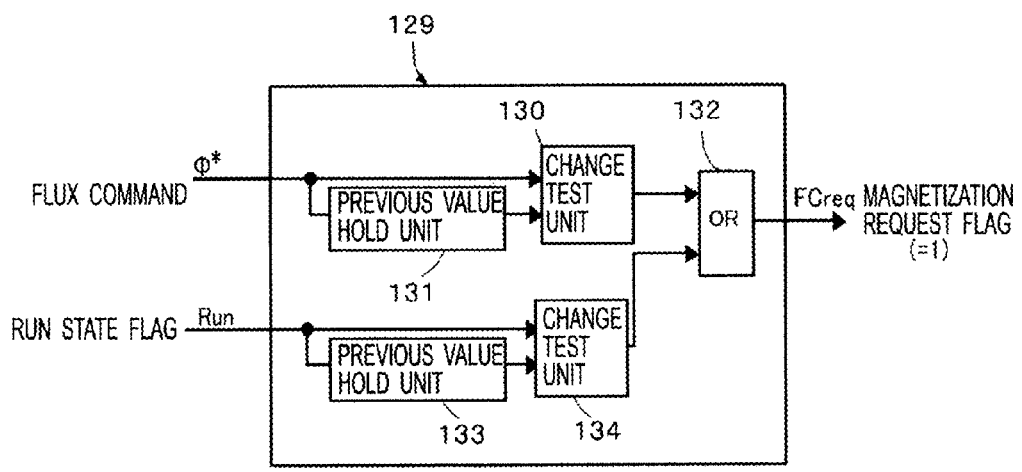
FIG. 10 is a block diagram illustrating an internal structure of a magnetization request generate unit in the permanent magnet motor drive system according to the above-mentioned embodiment.

FIG. 9 illustrates BH characteristics (flux density-magnetization characteristics) of the fixed magnet FMG and variable magnet VMG. FIG. 10 illustrates a quantitatively correct relationship only of the second quadrant of FIG. 9. In the cases of the neodymium magnet and alnico magnet, there is no significant difference between residual flux densities Br1 and Br2. Concerning coercive forces Hc1 and Hc2, the alnico (AlNiCo) magnet is 1/15 to 1/8 of the neodymium (NdFeB) magnet and an FeCrCo magnet is 1/15 of the same.

According to the conventional permanent magnet motor drive system, a magnetization zone by an output current of an inverter is sufficiently smaller than that of the coercive force of the neodymium (NdFeB) magnet and is used within the reversible range of the magnetization characteristic thereof. The variable magnet, however, has a small coercive force as mentioned above, and therefore, is usable in a nonreversible zone (in which a flux density B before the application of a current is never restored even if the current is zeroed) within an output current range of the inverter. Accordingly, the variable magnet can vary a flux density (flux amount).

An equivalent simplified model of a dynamic characteristic of the variable-flux motor 1 is expressible with Math. (1). This model is a model on a dq-axes rotating coordinate system with the d-axis oriented in the direction of magnet flux and the Q-axis in a direction orthogonal to the d-axis.

[Math. 1]

$$\begin{bmatrix} Vd \\ Vq \end{bmatrix} = \frac{d}{dt} \times \begin{bmatrix} Ld & 0 \\ 0 & Lq \end{bmatrix} \times \begin{bmatrix} Id \\ Iq \end{bmatrix} + \begin{bmatrix} R1 & -\omega1 \times Lq \\ \omega1 \times Ld & R1 \end{bmatrix} \times \begin{bmatrix} Id \\ Iq \end{bmatrix} + \begin{bmatrix} 0 \\ \omega1 \times (\Phi fix + \Phi var) \end{bmatrix} \quad (1)$$

Here, R1 is a coil resistance, Ld is a d-axis inductance, Lq is a Q-axis inductance, Φfix is a flux amount of the fixed magnet, Φvar is a flux amount of the variable magnet, and ω1 is an inverter frequency.

FIG. 7 illustrates a main circuit 100A and a control circuit 100B of the permanent magnet motor drive system 100 according to the first embodiment. The main circuit 100A includes a DC power source 103, an inverter 104 for inverting DC power into AC power, and the variable flux permanent magnet motor 101 driven by the AC power from the inverter 104. The main circuit 100A is provided with an AC current detector 102 to detect motor power and a speed detector 118 to detect a motor speed.

Next, the control circuit 100B will be explained. It receives a run command Run* and a torque command Tm*. A run command generate unit 116 receives the run command Run* and a protect signal PROT from a protection test unit 117 and generates and outputs a run state flag Run. Basically, the run state flag Run is set to a run state (Run=1) when the run command Run* is input (Run*=1). If the run command instructs a stoppage (Run*=0), the run state flag Run is set to a stop state (Run=0). If the protection test unit 117 determines that it is protective (PROT=1), the run state is set to the stop state of Run=0 even with the run command Run*=1.

A gate command generate unit 115 receives the run state flag Run and generates and outputs a gate command Gst for switching elements incorporated in the inverter 104. If the run state flag Run changes from stoppage (Run=0) to run (Run=1), the gate command generate unit 115 instantaneously sets a gate start state (Gst=1), and if the run state flag Run changes from run (Run=1) to stoppage (Run=0), sets a gate off state (Gst=0) after a predetermined time.

A flux command operate unit 112 receives the run state flag Run and the inverter frequency ω1, i.e., the rotor rotational frequency ωR and generates and outputs a flux command Φ* according to, for example, the below-mentioned expression (2). If it is a stop state (Run=0), the flux command Φ* is set to a minimum Φmin. If it is a run state (Run=1) and if the rotational frequency ωR is lower than a predetermined value, the flux command Φ* is set to a maximum Φmax. If the speed is higher than a predetermined value, the flux command Φ* is set to the minimum Φmin.

[Math. 2]

If (Run=0)

Φ*=Φmin

Else if (|ω1|<ωA)

Φ*=Φmax

Else

Φ*=Φmin  (2)

Here, Φmin is a minimum flux amount (>0) to be taken by the variable-flux motor 101, Φmax is a maximum flux amount to be taken by the variable-flux motor 101, and ωA is the predetermined rotational frequency. Setting the flux amounts Φmin and Φmax will be explained later in connection with a variable flux control unit 113.

A current reference operate unit 111 receives the torque command Tm* and flux command Φ* and calculates a d-axis current reference IdR and a q-axis current reference IqR according to the following expressions (3) and (4):

[Math. 3]

$IdR=0$  (3)

$IqR=Tm^*/\Phi^*$  (4)

Here, the expressions (3) and (4) are operational expressions assuming that a reluctance torque of the motor is not used and the number of poles of the motor is zero. The motor may be any one of a salient motor having a difference ΔL between the d-axis inductance Ld and the Q-axis inductance Lq and a non-salient motor having no such a difference.

To optimize efficiency or maximize output with a predetermined current, considering the reluctance torque is effective. In this case, the following expressions are used:

[Math. 4]

$IqR=(-\Phi^*+\sqrt{\Phi^{*2}-4\times(Ld-Lq)\times K\times Tm^*})/2\times(Ld-Lq)\times K$  (5)

$IdR=K\times IqR$  (6)

Here, K is a ratio of a d-axis current to a Q-axis current that may vary depending on the above-mentioned optimization of efficiency and the maximization of output. For the optimization, the expression becomes a function whose arguments include torque, speed, and the like and is generally used through a simple approximation or as a table. The flux command Φ* in the expression (5) is also operable with the use of an estimated flux value Φh.

FIG. 10 illustrates the details of a magnetization request generate unit 129. The block of FIG. 10 is controlled by a control microcomputer at predetermined intervals. The flux command Φ* is supplied to a previous value hold unit 131 and is held therein. An output from the previous value hold unit 131 is a flux command Φ* stored last time and is sent to a change test unit 130 together with a flux command value Φ* of this time. The change test unit 30 outputs 1 if there is a change between the two inputs, and outputs 0 if there is no change. Namely, only when the flux command Φ* changes, it outputs 1. A similar circuit configuration is prepared for the run state flag Run in place of the flux command Φ* and flag values are supplied to and held in a previous value hold unit 133. An output from the previous value hold unit 133 is a run state flag Run stored last time and is sent together with a run state flag Run of this time to a change test unit 134. Outputs from the two change test units 130 and 134 are supplied to an OR unit 132, which provides an OR of the two inputs as a magnetization request flag FCreq.

The magnetization request flag FCreq, i.e., the output from the magnetization request generate unit 129 establishes a magnetization request (FCreq=1) if the flux command Φ* or the run state flag Run changes and no magnetization request (FCreq=0) in the other cases. The run state flag Run changes, for example, when the inverter starts to operate, or when it stops, or when it is stopped for protection. Although the embodiment employs the flux command Φ*, a change in a magnetizing current command Im* (an output from a magnetizing current table 127) of a variable flux control unit 113 to be explained later may be used to generate the magnetization request FCreq.

Figure 11:
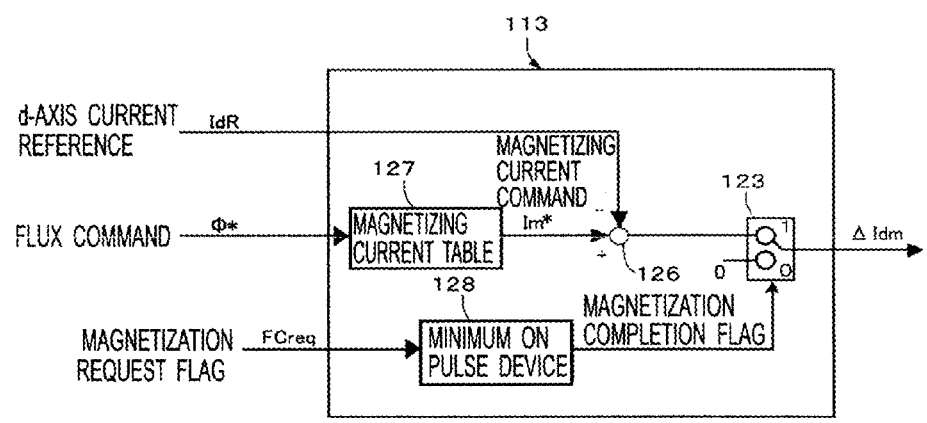
FIG. 11 is a block diagram illustrating an internal structure of a variable flux control unit in the permanent magnet motor drive system according to the above-mentioned embodiment.

FIG. 11 illustrates the details of the variable flux control unit 113. The variable flux control unit 113 receives the flux command Φ*, i.e., the output from the flux command operate unit 112 and outputs a d-axis magnetizing current difference ΔIdm* to correct the d-axis current reference IdR. The generation of the magnetizing current difference ΔIdm* is made according to the below-mentioned operation.

To magnetize the variable magnet VMG, a predetermined magnetizing current command Im* must be obtained according to the BH characteristic of the variable magnet illustrated in FIG. 9. In particular, the magnitude of the magnetizing current command Im* is set to be equal to or larger than Hlsat of FIG. 9, i.e., within a magnetization saturation zone of the variable magnet.

To pass a magnetizing current up to the magnetization saturation zone, the flux amounts Φmin and Φmax set by the flux command operate unit 112 must be calculated by adding a positive or negative maximum (saturated) flux value (flux density) of the variable magnet to that of the fixed magnet. Namely, with the positive maximum flux amount (the absolute value of a negative maximum flux amount being equal to that of the positive maximum flux amount) of the variable magnet VMG being Φvarmax and the flux amount of the fixed magnet FMG being Φfix, they are expressed as follows:

[Math. 5]

$$\Phi min = \Phi fix - \Phi varmax \quad (7)$$

$$\Phi max = \Phi fix + \Phi varmax \quad (8)$$

The flux command Φ* is used to look up the magnetizing current table 127 storing corresponding magnetizing currents and output a magnetizing current command Im* for obtaining the flux command Φ*.

Basically, the magnetization direction of a magnet is in the direction of the d-axis, and therefore, the magnetizing current Im* is given to a d-axis current command Id*. According to the embodiment, the d-axis current reference IdR that is an output from the current reference operate unit 111 is corrected by the d-axis magnetizing current command difference ΔIdm*, to provide the d-axis current command Id*. Accordingly, a subtracter 126 finds the d-axis magnetizing current command ΔIdm* from the following expression:

[Math. 6]

$$\Delta Idm^* = Im^* - IdR \quad (9)$$

To change flux, a configuration is possible to directly give the magnetizing current Im* to the d-axis current command Id*.

On the other hand, the magnetization request flag FCreq for requesting to change flux becomes a switching request state (FCreq=1) at least momentarily. To surely change flux, the magnetization request flag FCreq is input to a minimum ON pulse device 128, which outputs a magnetization completion flag (=1 during magnetization and =0 at the completion of magnetization). This flag has a function not to become OFF (=0) for a predetermined time once it becomes ON (=1). If the input keeps ON (=1) over the predetermined time, the output becomes OFF as soon as the input becomes OFF.

A switch 123 receives the magnetization completion flag. If it is during magnetization (magnetization completion flag=1), the switch outputs the output from the subtracter 126, and if it is the completion of magnetization (magnetization completion flag=0), 0.

According to the d- and q-axis current commands Id* and Iq* thus provided, the voltage command operate unit 110 generates d- and q-axis voltage commands Vd* and Vq* to pass currents conforming to the commands in question.

The coordinate convert unit 105 converts the d- and q-axis voltage commands Vd* and Vq* into three-phase voltage commands Vu*, Vv*, and Vw* to PWM-control the inverter 104. A coordinate convert unit 107 converts AC currents Iu and Iw detected by the current detector 102 into d- and q-axis current detected values Id and Iq, which are input to the voltage command operate unit 110. A pseudo differentiator 108 finds an inverter frequency Φ1 from a signal from the speed detector 118. The voltage command operate unit 110, coordinate convert units 105 and 107, and PWM circuit 106 are conventional ones employing known techniques.

Figure 12:
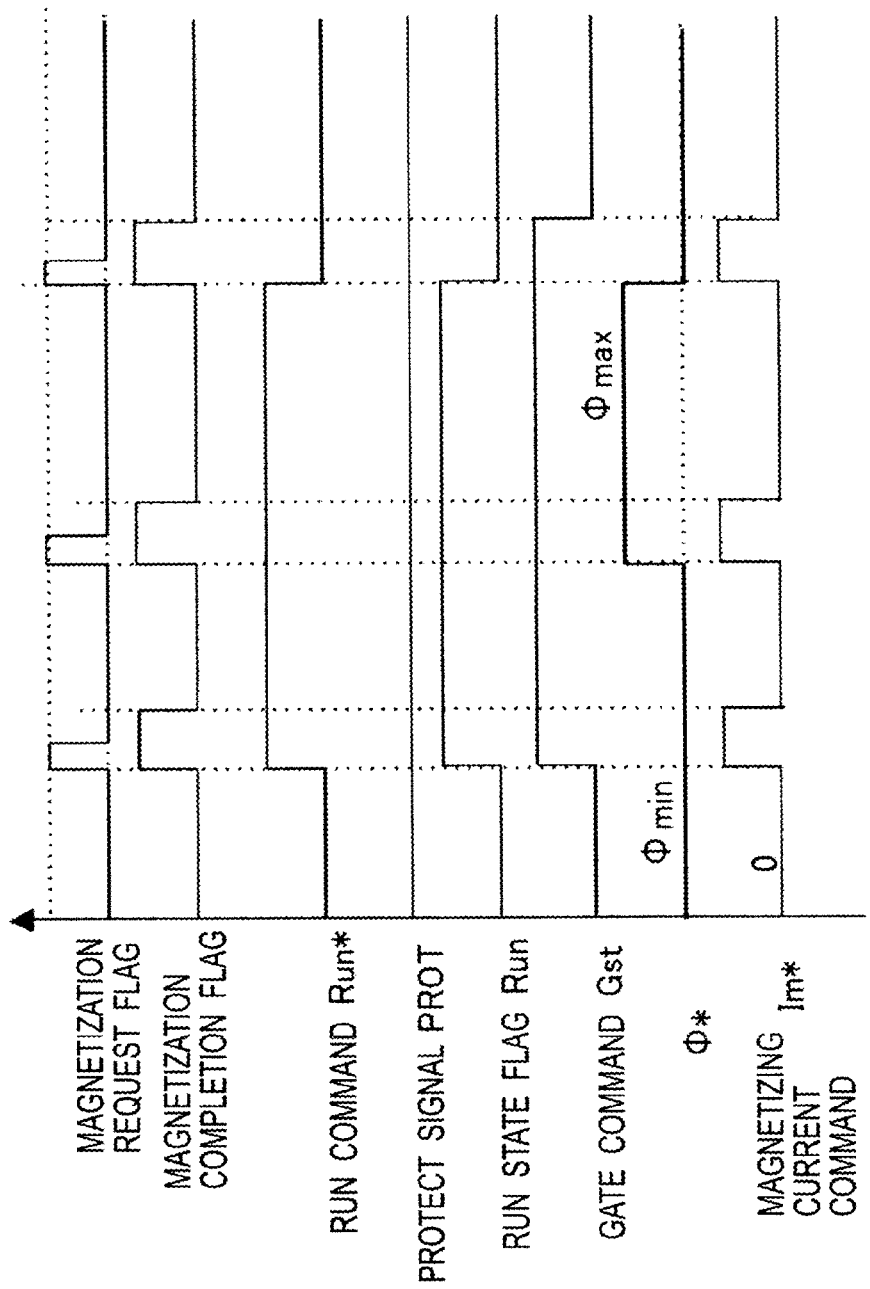
FIG. 12 is a timing chart of motor control by the permanent magnet motor drive system according to the above-mentioned embodiment.

FIG. 12 is an example of a timing chart illustrating operations of signals in a state in which the protect signal is not established (PROT=0). The run state flag Run changes and the flux command Φ* changes, to set the magnetization request flag. The magnetization completion flag keeps an ON state for a predetermined time. Only during the period of the magnetization completion flag, the magnetizing current command Im* has a value.

Next, operation of the permanent magnet rotating electrical machine according to the embodiment having the above-mentioned configuration and operation of the drive system thereof will be explained. A magnetomotive force necessary for magnetization per pole is approximated by the product of a magnetic field necessary for magnetization and the thickness of a permanent magnet. The alnico permanent magnet 3 is magnetized nearly 100% with a magnetic field of 250 kA/m. The product of the magnetizing field and the magnet thickness per pole is expressed as 250 kA/m×(6×10$^{-3}$/2) m=750 A.

The NdFeB permanent magnet 4 is magnetized nearly 100% with a magnetic field of 1500 to 2500 kA/m. The product of the magnetizing field and the magnet thickness per pole is expressed as 1500 to 2500 kA/m×(2×10$^{-3}$) m=3000 to 5000 A. Accordingly, the alnico permanent magnet 3 is magnetized with a magnetic field of about ¼ to ⅙ of that for the NdFeB permanent magnet 4. In a magnetic field that is sufficient to magnetize the alnico permanent magnet 3, the NdFeB permanent magnet 4 is in a reversibly demagnetized state, and therefore, the NdFeB permanent magnet 4 can maintain a flux state before magnetization even after magnetization.

According to the embodiment, the armature coil 21 of the stator 20 passes a pulse current for a very short time (about 0.1 ms to 10 ms), to form a magnetic field that acts on the alnico permanent magnets 3. The current passing time may change depending on the magnitude of a coil inductance of the rotating electrical machine and a current waveform. The pulse current that forms a magnetizing field for the permanent magnets is a d-axis current component of the armature coil 21 of the stator 20. If the magnetizing field is of 250 kA/m, the magnetizing field is theoretically sufficient to magnetize the alnico permanent magnets 3 and causes no irreversible demagnetization on the NdFeB permanent magnets 4.

Figure 3:
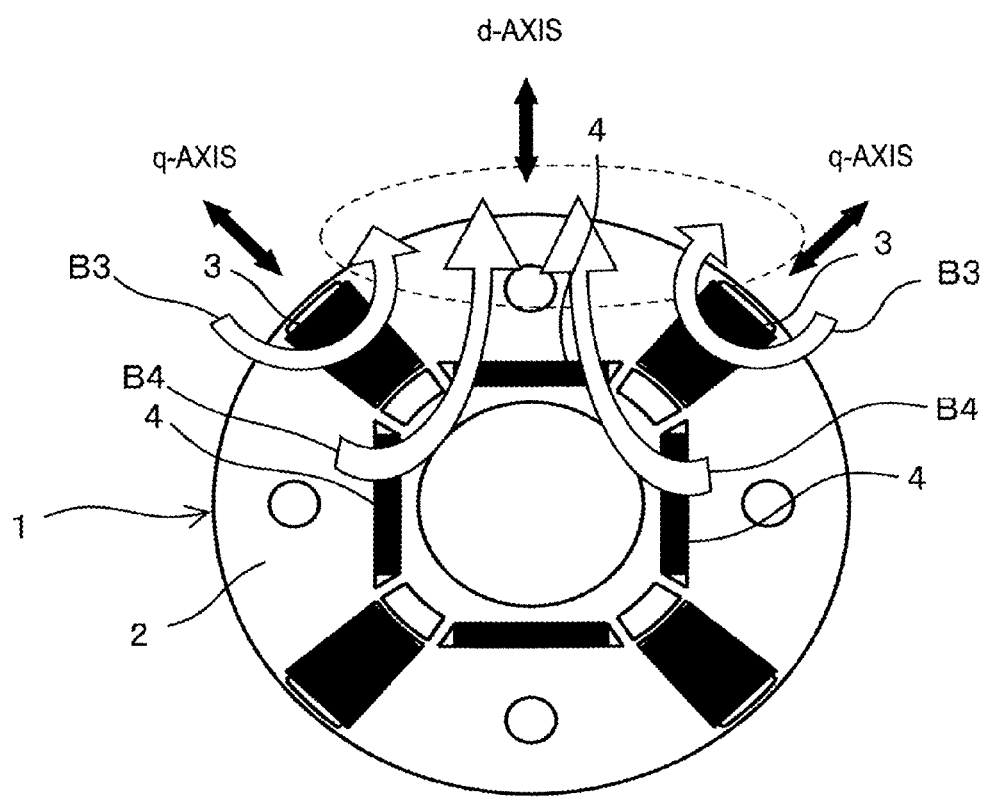
FIG. 3 is an explanatory view of flux (maximum linkage flux) of permanent magnets that have irreversibly magnetized with a d-axis current passed for a short time in the rotor of the above-mentioned embodiment.

FIG. 3 illustrates fluxes of the permanent magnets when a magnetizing field acts such that the fluxes of the alnico and NdFeB magnets are additive at the magnetic poles and air gap face. In FIG. 3, linkage flux by the permanent magnets 3 and 4 increases to establish a magnetizing state. The magnetizing field is created by passing a pulse current for a very short time through the armature coil 21 of the stator 20. The current passed at this time is a d-axis current component. The pulse current quickly becomes zero to eliminate the magnetizing field. However, the alnico permanent magnets 3 irreversibly change to generate flux B3 in the magnetizing direction. B4 is flux by the NdFeB permanent magnets 4. Flux distributions in FIGS. 3, 4, and 5 are those related to one magnetic pole.

Figure 4:
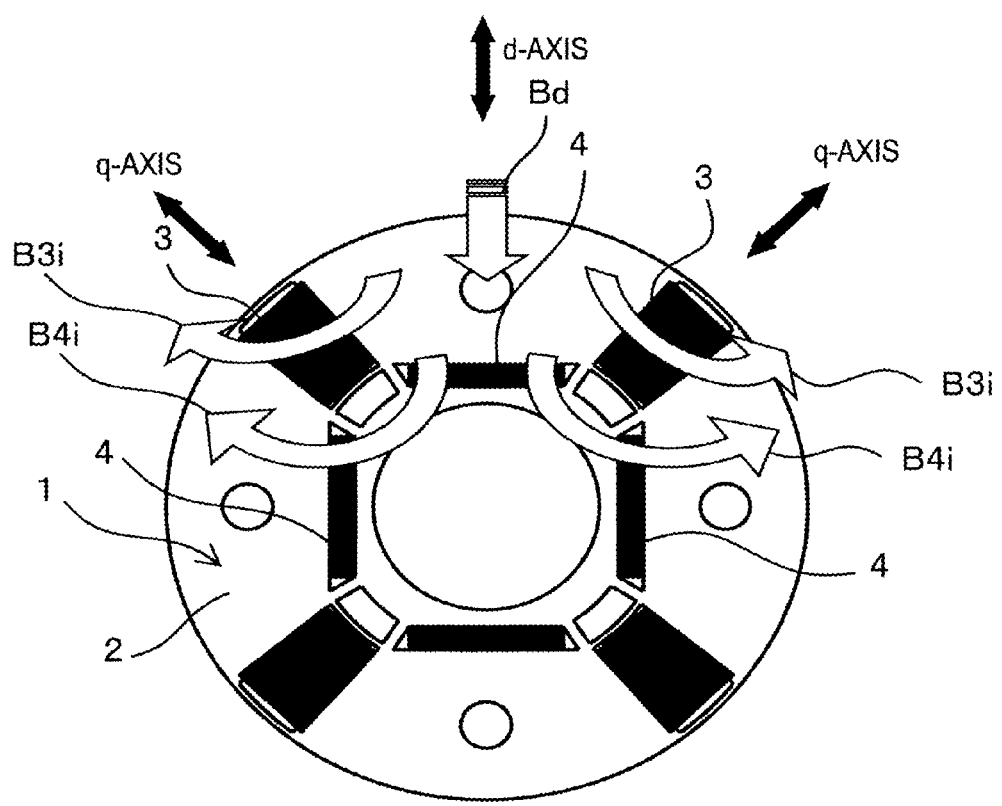
FIG. 4 is an explanatory view of flux of a demagnetizing field created by a d-axis current passed for a short time in the rotor of the above-mentioned embodiment.
Figure 5:
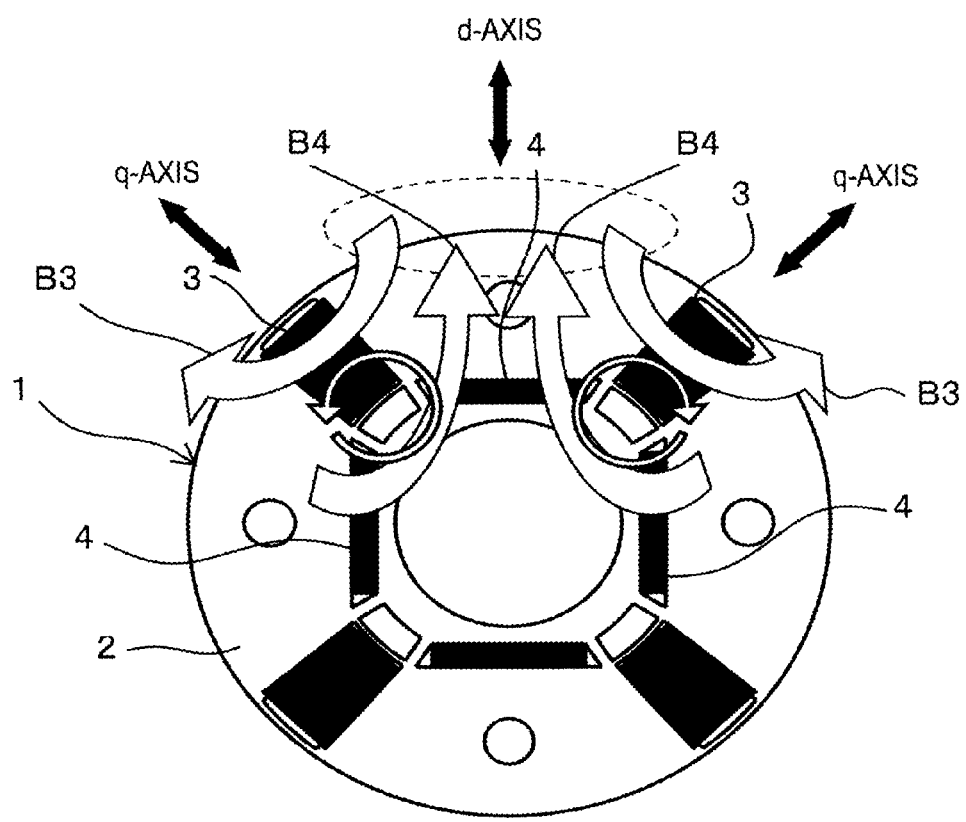
FIG. 5 is an explanatory view of flux (minimum linkage flux) of permanent magnets after the action of the demagnetizing field created by the d-axis current passed for a short time (after the annihilation of the magnetic field created by the d-axis current) in the rotor of the above-mentioned embodiment.

FIG. 4 illustrates an action to decrease linkage flux. A negative d-axis current is passed through the armature coil 21, to form a magnetic field Bd that generates fluxes in a direction opposite to the direction illustrated in FIG. 3. The magnetic field Bd created by the negative d-axis current passed through the armature coil 21 acts from the pole center of the rotor 1 toward the alnico and NdFeB permanent magnets 3 and 4 opposite to the magnetizing direction. The permanent magnets 3 and 4 receive magnetic fields B3$i$ and B4$i$ in a direction opposite to the magnetizing direction of FIG. 3. Since the alnico permanent magnet 3 is small in the product of coercive force and thickness along magnetizing direction, the flux of the alnico permanent magnet 3 irreversibly decreases due to the opposite magnetic field. On the other hand, the NdFeB permanent magnet 4 is large in the product of coercive force and thickness along magnetizing direction, and therefore, the magnetic characteristic thereof is within a reversible range even when it receives the opposite magnetic field. Accordingly, the magnetized state thereof is unchanged after the magnetizing field Bd by the negative d-axis current disappears and the flux amount thereof is also unchanged. Consequently, only the alnico permanent magnets 3 are demagnetized to reduce a linkage flux amount.

The embodiment also passes a larger current to form a strong opposite magnetic field to reverse the polarity of the alnico permanent magnets 3. Reversing the polarity of the alnico permanent magnets 3 results in greatly reducing linkage flux, even zeroing the linkage flux.

Generally, the product of magnetizing field and magnet thickness per pole of the alnico magnet is about ¼ to ⅙ of that of the NdFeB magnet, and therefore, a magnetic field that is sufficient to magnetize only the alnico permanent magnet 3 is generated. FIG. 5 illustrates a magnetized state established with a negative d-axes current. The flux B4 of the NdFeB permanent magnets 4 is canceled with the opposite flux B3 of the alnico permanent magnets 3. If the flux amount B3 of the magnets 3 is equal to the flux amount B4 of the magnets 4, an air gap flux will nearly be zeroed. At this time, the flux B4 of the NdFeB permanent magnets 4 is cancelled and forms a magnetic circuit with the alnico permanent magnets 3. Accordingly, the fluxes are largely distributed within the rotor 1. This results in uniformly zeroing a distribution of air gap flux densities.

To increase linkage flux from the above-mentioned linkage-flux-zero state, a d-axis current is passed to create a magnetic field to reduce the flux B3 of the alnico permanent magnets 3 whose polarity is reversed in the linkage-flux-zero state. Since the polarity of the alnico permanent magnets 3 is reversed, the magnetic field to act on the alnico permanent magnets 3 is in the same direction as the original magnetizing direction of the alnico permanent magnets 3 illustrated in FIG. 3. Namely, the direction is opposite to the direction of the magnetic field Bd created by the d-axis current illustrated in FIG. 4. To restore the original maximum linkage flux state by further increasing linkage flux, the polarity of the alnico permanent magnets 3 is again reversed (returning to the original polarity) to the state of FIG. 3. In this way, in the permanent magnet rotating electrical machine of the embodiment, the alnico permanent magnets 3 are operated in a full range from the first quadrant to the fourth quadrant on the magnetic characteristic curve (the B-H curve representative of the flux density-magnetic field characteristic).

On the other hand, permanent magnets in the conventional permanent magnet rotating electrical machine are operated only in the second quadrant. To decrease linkage flux, the conventional permanent magnet rotating electrical machine passes a negative d-axis current to the armature coil 21 to create flux that cancels the flux of the permanent magnets 4 of the rotor 1. However, in an interior permanent magnet motor, fundamental linkage flux is reduced only to about 50% and harmonic flux substantially increases to cause the problems of harmonic voltages and harmonic iron loss. It is very difficult, therefore, to zero linkage flux. Even if the fundamental wave is zeroed, harmonic flux increases to a fairly large level. On the other hand, in the permanent magnet rotating electrical machine of the embodiment, fluxes of the permanent magnets 3 and 4 of the rotor 1 are sufficient to uniformly reduce linkage flux, to cause little harmonic flux and no increase in losses.

A mutual magnetic influence between the alnico permanent magnet 3 and the NdFeB permanent magnet 4 will be explained. In the demagnetizing state of FIG. 5, the magnetic field of the NdFeB permanent magnet 4 acts as a biasing magnetic field on the alnico permanent magnet 3. Namely, a magnetic field by a negative d-axis current and the magnetic field by the NdFeB permanent magnet 4 act on the alnico permanent magnet 3, to easily magnetize the alnico permanent magnet 3. The product of coercive force and thickness along magnetizing direction of the alnico permanent magnet 3 can be made equal to or larger than the product of magnetic field strength and thickness along magnetizing direction of the NdFeB permanent magnet 4 at a no-load operating point. Then, in a linkage flux increased state, the magnetic field of the alnico permanent magnet 3 overcomes the magnetic field of the NdFeB permanent magnet 4, to provide a flux amount.

As mentioned above, the rotating electrical machine of the embodiment employs a d-axis current to widely change the linkage flux amount of the alnico permanent magnet 3 from a maximum to zero and magnetize the magnet in both the normal and reverse directions. If the linkage flux B4 of the NdFeB permanent magnet 4 is in the normal direction, the linkage flux B3 of the alnico permanent magnet 3 is adjustable from a maximum to zero, and further, to a maximum in the reverse direction.

As a result, the permanent magnet rotating electrical machine of the embodiment can magnetize the alnico permanent magnet 3 with a d-axis current, to adjust the total linkage flux amount of the alnico and NdFeB permanent magnets 3 and 4 in a wide range. In a low-speed zone, the alnico permanent magnet 3 is magnetized with a d-axis current so that the flux thereof takes the maximum value in the same direction as the linkage flux of the NdFeB permanent magnet (the magnetizing state illustrated in FIG. 3). This maximizes torque produced by the permanent magnets, and therefore, the torque and output of the rotating electrical machine are maximized. In middle- and high-speed zones, the flux amount of the alnico permanent magnet 3 is irreversibly decreased to decrease the total linkage flux amount. This results in decreasing the voltage of the rotating electrical machine, to make a margin for the upper limit value of a power source voltage, thereby enabling a rotation speed (frequency) to be increased further. To extremely increase a maximum speed (to further expand a variable speed range to, for example, a range three times a base speed or higher), the alnico permanent magnet 3 is magnetized in a direction opposite to the direction of the linkage flux of the NdFeB permanent magnet 4 (the flux B3 of the alnico permanent magnet 3 is oriented as illustrated in FIG. 5 and the magnet 3 is magnetized to the maximum). Then, the total linkage flux of the permanent magnets 3 and 4 is the difference between the linkage flux of the NdFeB permanent magnet 4 and that of the alnico permanent magnet 3. Namely, the total linkage flux is minimized. At this time, the voltage of the rotating electrical machine is also minimized, to maximize the rotation speed (frequency) thereof.

In this way, the permanent magnet rotating electrical machine and the permanent magnet motor drive system for rotating and driving the same according to the embodiment can realize a variable-speed operation in a wide range at high output from low rotation speed to high rotation speed. In addition, the permanent magnet rotating machine of the embodiment passes a magnetizing current for changing linkage flux only for a very short time. This results in remarkably reducing a loss and realizing high efficiency in a wide operating range.

Next, in the permanent magnet rotating electrical machine and permanent magnet motor drive system according to the embodiment, demagnetization of the permanent magnets 3 and 4 due to a load current (q-axis current) at the time of torque generation will be explained. When the permanent magnet rotating electrical machine of the embodiment generates torque, the armature coil 21 of the stator 20 passes a q-axis current, so that the q-axis current and the flux of the permanent magnets 3 and 4 cause a magnetic action to generate torque. At this time, the q-axis current creates a magnetic field. For this, the permanent magnet rotating electrical machine of the embodiment arranges the alnico permanent magnet 3 in the vicinity of the q-axis so that the magnetizing direction thereof becomes orthogonal to the q-axis. With this, the magnetizing direction of the alnico permanent magnet 3 and the magnetic field by the q-axis current ideally become orthogonal to each other, to substantially eliminate the influence of the magnetic field by the q-axis current.

However, in a maximum torque state or in a rotating electrical machine with an armature coil of large ampere-turn for miniaturization and high output, the magnetic field created by the q-axis current, i.e., load current becomes fairly large. When a permanent magnet whose product of coercive force and thickness is small is arranged on a rotor, the magnetic field created by an excessive q-axis current irreversibly demagnetizes the permanent magnet on the q-axis. Namely, the demagnetization of the permanent magnet due to the q-axis torque reduces generated torque.

Figure 6:
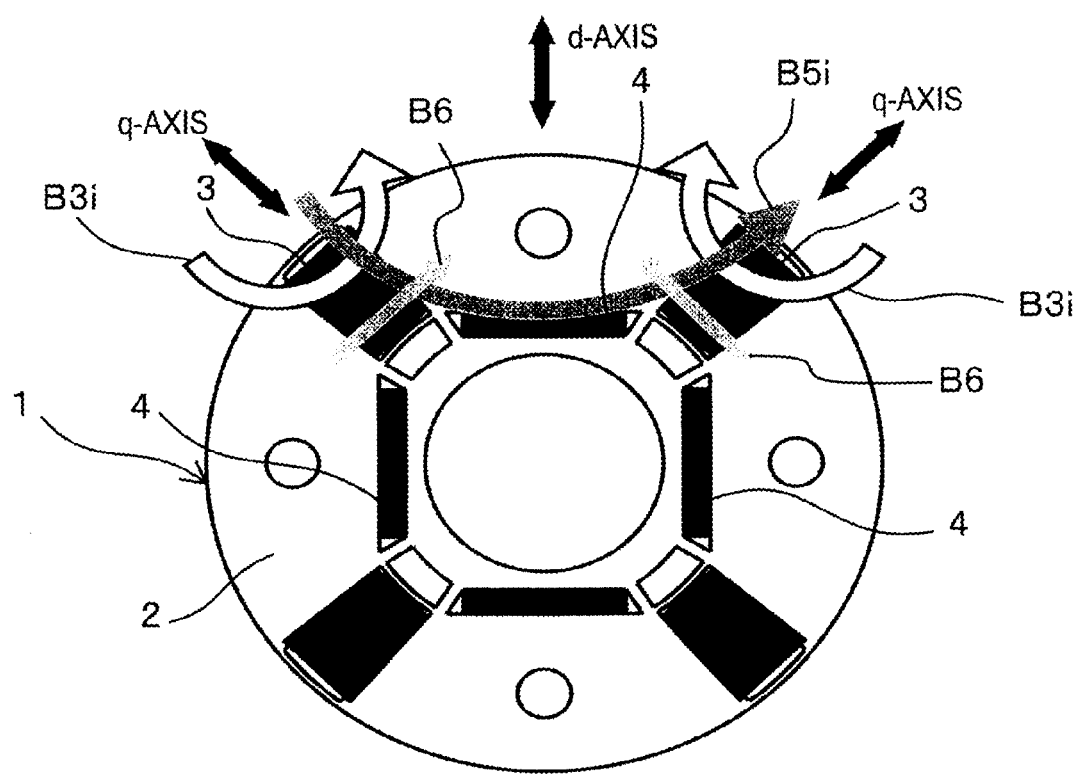
FIG. 6 is an explanatory view of a magnetic field created by a positive d-axis current and a magnetic field created by a load current (q-axis current) in the rotor of the above-mentioned embodiment.

To cope with this, the permanent magnet rotating electrical machine according to the embodiment overlaps a positive d-axis current on a q-axis current when generating large torque. FIG. 6 is a model illustrating an action of a magnetic field when a positive d-axis current is overlapped at the time of torque generation. In FIG. 6, B3$i$ is the magnetic field by the positive d-axis current, B5$i$ is a magnetic field by a load current (q-axis current), and B6 is a magnetizing direction of the permanent magnet 3 whose product of coercive force and thickness along magnetizing direction is small. In a large torque range, the two kinds of permanent magnets 3 and 4 at each pole are additively oriented, and in this state, the positive d-axis current is in the same direction as the magnetizing direction of the permanent magnet 3. Consequently, as illustrated in FIG. 6, the inside of the permanent magnet 3 also influenced by the magnetic field B3$i$ created by the positive d-axis current to cancel the demagnetizing magnetic field by the q-axis current. Even with the permanent magnets 3 whose product of coercive force and thickness is small according to the embodiment, the irreversible demagnetization of the permanent magnets 3 is suppressed even in a large torque generating state, a torque decrease due to the magnetic field B5$i$ by the load current is suppressed, and large torque is produced.

Next, an action of the hollow 5 formed at each end of each of the permanent magnets 3 and 4 will be explained. When the permanent magnets 3 and 4 apply a centrifugal force to the rotor core 2, the hollow 5 relaxes a stress concentration on the rotor core 2 and a demagnetizing field. With the hollows 5 arranged as illustrated in FIG. 1, the rotor core 2 may have a curved shape to relax stress. A magnetic field created by a current tends to concentrate at each corner of the permanent magnets 3 and 4, and therefore, a demagnetizing field tends to irreversibly demagnetize the corner. The embodiment forms the hollow 5 at each end of the permanent magnets 3 and 4, to weaken the demagnetizing field by a current at each corner of the permanent magnets.

Next, the structural strength of the rotor 1 according to the embodiment will be explained. The alnico and NdFeB permanent magnets 3 and 4 are embedded in and held by the rotor core 2. To sufficiently resist against centrifugal force at high-speed rotation, the center of the magnetic pole portion 7 is provided with a bolt hole 6 to fasten the rotor core 2 with a bolt to a rotor end plate and a shaft.

With the above-mentioned configuration, the permanent magnet rotating electrical machine and permanent magnet motor drive system according to the embodiment provide effects mentioned below. Assuming that the linkage flux of the NdFeB permanent magnet 4 is oriented in the normal direction, the linkage flux of the alnico permanent magnet 3 is adjustable in a wide range from a maximum value in the normal direction to zero to a maximum value in the opposite direction. In this way, the alnico permanent magnet 3 is operated in a full range from the first quadrant to the fourth quadrant on a magnetic characteristic curve. The embodiment magnetizes the alnico permanent magnet 3 with a d-axis current, to widely adjust the total linkage flux amount of the alnico and NdFeB permanent magnets 3 and 4. Adjusting the total linkage flux amount of the permanent magnets results in widely adjusting the voltage of the rotating electrical machine. Magnetization is carried out by passing a pulse current for a very short time, and therefore, there is no need of always passing a flux-weakening current, to thereby greatly reduce a loss. Unlike the related art, the embodiment has no need of carrying out the flux-weakening control, and therefore, causes no harmonic iron loss due to harmonic flux.

In this way, the permanent magnet rotating electrical machine and permanent magnet motor drive system according to the embodiment realize a variable-speed operation at high output in a wide range from low speed to high speed and achieve high efficiency in the wide operating range. In connection with a voltage induced by the permanent magnets, the alnico permanent magnet 3 is magnetized with a d-axis current to reduce the total linkage flux amount of the permanent magnets 3 and 4. This prevents the breakage of inverter electronic parts due to the induced voltage of the permanent magnets, thereby improving the reliability of the machine. When the rotating electrical machine turns under no load, the alnico permanent magnet 3 is magnetized with a negative d-axis current to reduce the total linkage flux amount of the permanent magnets 3 and 4. This remarkably reduces the induced voltage, to substantially eliminate the need of always passing a flux-weakening current to decrease the induced voltage, thereby improving total efficiency. In particular, when the permanent magnet rotating electrical machine of the embodiment is installed in a commuter train that involves a long coasting interval, it greatly improves the total running efficiency of the train.

According to the permanent magnet rotating electrical machine and permanent magnet motor drive system of the embodiment, the permanent magnet 4 whose product of coercive force and thickness along magnetizing direction is large is an NdFeB magnet and the permanent magnet 3 whose product of coercive force and thickness along magnetizing direction is small is an alnico magnet. At a maximum rotation speed, a counter electromotive voltage generated by the NdFeB permanent magnet 4 is configured to be equal to or lower than a withstand voltage of electronic parts of an inverter serving as a power source of the rotating electrical machine. This provides the below-mentioned effects. A counter electromotive voltage generated by a permanent magnet increases in proportion to a rotation speed. The counter electromotive voltage is suppressed below the withstand voltage of inverter electronic parts or the power source voltage by always passing a d-axis current. If an uncontrollable state occurs, the counter electromotive voltage may exceed the withstand voltage of inverter electronic parts, to cause insulation breakage. To cope with this, the permanent magnet rotating electrical machine according to the related art limits the counter electromotive voltage generated by a permanent magnet lower than the withstand voltage. This design, however, cuts a flux amount of the permanent magnet, thereby lowering the output and efficiency of the machine in a low-speed zone. On the other hand, the embodiment passes a d-axis current for a short time at high rotation speed, to generate a magnetic field in a demagnetizing direction, thereby irreversibly magnetize the permanent magnet and reducing the linkage flux of the permanent magnets 3 and 4. The embodiment, therefore, causes no excessive counter electromotive voltage even if an uncontrollable state occurs at high rotation speed.

If an electrical short circuit occurs in the armature coil 21 and the like, a short-circuit current demagnetizes the alnico permanent magnet 3 or reverses the polarity thereof, and therefore, linkage flux by the permanent magnets 3 and 4 is produced only by the NdFeB permanent magnet 4 or is zeroed at the time of the polarity reversal. Accordingly, the short-circuit current is instantaneously decreased by the rotating electrical machine itself. This prevents heat generation by braking force due to the short-circuit current or by the short-circuit current itself.

In this way, the permanent magnet rotating electrical machine and permanent magnet motor drive system according to the embodiment generate high torque (high output) at low rotation speed, achieve a variable speed operation at high output in a wide range from low speed to high speed, and realize high efficiency in a wide operating range. In addition, they suppress a counter electromotive voltage at high rotation speed and improve the reliability of the drive system including an inverter.

Second Embodiment

A permanent magnet rotating electrical machine and permanent magnet motor drive system according to the second embodiment of the present invention will be explained. This embodiment is characterized in that the permanent magnet rotating electrical machine 101 illustrated in FIG. 1 receives a pulse-like magnetic field created by a short-time d-axis current provided by the permanent magnet motor drive system illustrated in FIG. 7, to irreversibly magnetize the alnico permanent magnets 3 and change a linkage flux amount.

In this way, flux by a negative d-axis current is always created in a middle or high rotation speed zone, so that linkage flux consisting of the flux by the negative d-axis current and flux by the permanent magnets 3 and 4 is adjusted according to the flux by the negative d-axis current. Namely, in the middle or high speed zone, the pulse-like magnetic field created by a short-time d-axis current irreversibly changes the magnetized state of the alnico permanent magnets 3, thereby greatly changing a linkage flux amount, and the negative d-axis current that is always passed finely adjusts the linkage flux amount. At this time, the linkage flux amount finely adjusted by the negative d-axis current that is always passed is very small, and therefore, the always-passed negative d-axis current is too small to cause a large loss.

The permanent magnet rotating electrical machine according to the embodiment is capable of widely changing a linkage flux amount that is a basis of voltage, finely adjusting the linkage flux amount, and efficiently changing the same.

Third Embodiment

A permanent magnet rotating electrical machine according to the third embodiment of the present invention will be explained with reference to FIG. 13. The structure of a stator 20 in the permanent magnet rotating electrical machine of the embodiment is the same as that of the first embodiment illustrated in FIG. 1 and that of the related art illustrated in FIG. 20.

Figure 13:
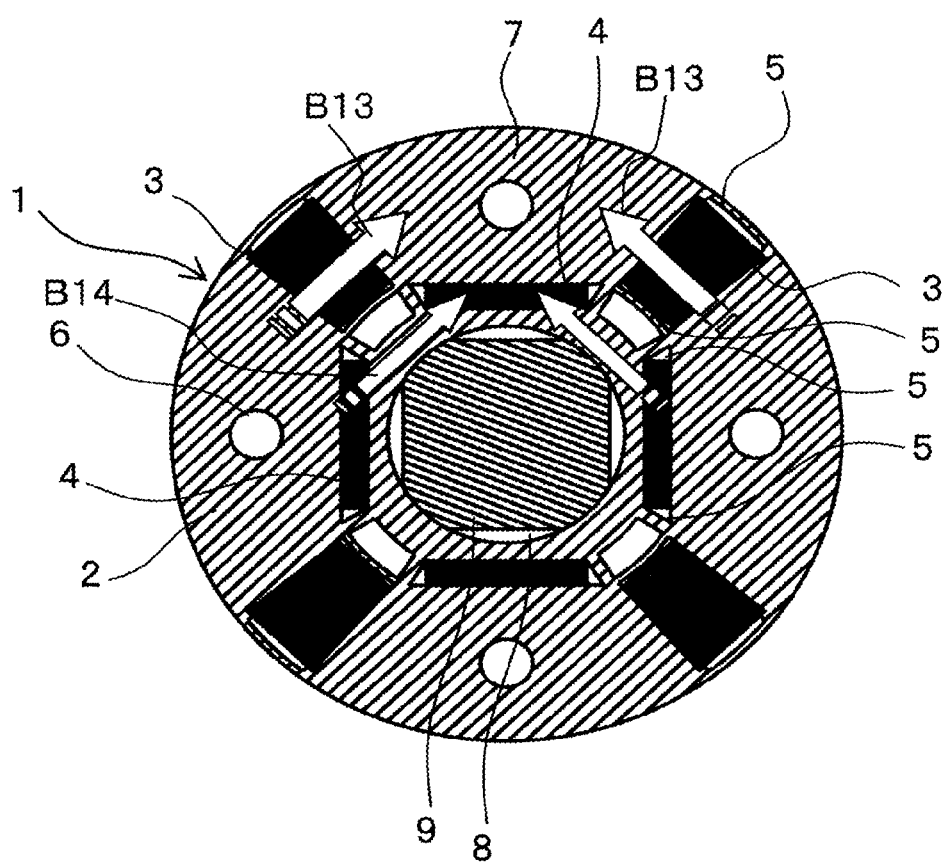
FIG. 13 is an explanatory view of a section of a rotor and flux in a permanent magnet rotating electrical machine according to a third embodiment of the present invention.

As illustrated in FIG. 13, a rotor 1 of this embodiment arranges each alnico permanent magnet 3 inside a rotor core 2 along a q-axis in a diametrical direction and each NdFeB permanent magnet 4 inside the rotor core 2 in a circumferential direction orthogonal to a d-axis. An inner circumferential side of the rotor core 2 of the rotor 1 is engaged with an iron shaft 9. The shaft 9 has four cut faces to form an air layer 8 between the rotor core 2 and the shaft 9. The shaft 9 may be made of a nonmagnetic material.

An armature coil 21 passes a current to generate a magnetic field for magnetizing the permanent magnets. The magnetic field acts on the alnico and NdFeB permanent magnets 3 and 4, to form fluxes indicated with arrows B13 and B14 in FIG. 13. The fluxes created by the current do not pass through the shaft 9 because of the air layer 8 but pass through a narrow iron core part on the inner circumferential side between the NdFeB permanent magnets 4. This narrow iron core part, however, easily magnetically saturates, to reduce the flux that is generated by the magnetic field created by the armature current and passes through the NdFeB permanent magnet 4.

As a result, the flux of the alnico permanent magnets 3 that must be magnetized increases, and at the same time, the flux of the NdFeB permanent magnets 4 decreases to relax the magnetic saturation of the magnetic pole portions 7 and stator iron core 22. This results in reducing a d-axis current necessary for magnetizing the alnico permanent magnets 3. If the shaft 9 is made of a nonmagnetic material, flux leakage to the shaft 9 decreases to further reduce the flux passing through each NdFeB magnet 4, to further relax the magnetic saturation of the magnetic pole portions 7 and stator iron core 22.

Fourth Embodiment

The fourth embodiment of the present invention will be explained. This embodiment employs, for the permanent magnet rotating electrical machine of the first to third embodiments, an NdFeB magnet having little Dy (dysprosium) element or Tb (terbium) as the permanent magnet 3 whose product of coercive force and thickness along magnetizing direction is small in the rotor 1. The Dy element and Tb element are added to improve a demagnetization resisting characteristic of the NdFeB magnet under high temperatures. When receiving a demagnetizing field under high temperatures, the permanent magnet is irreversibly demagnetized, and therefore, the above-mentioned additives are used to suppress the irreversible demagnetization.

Figure 14:
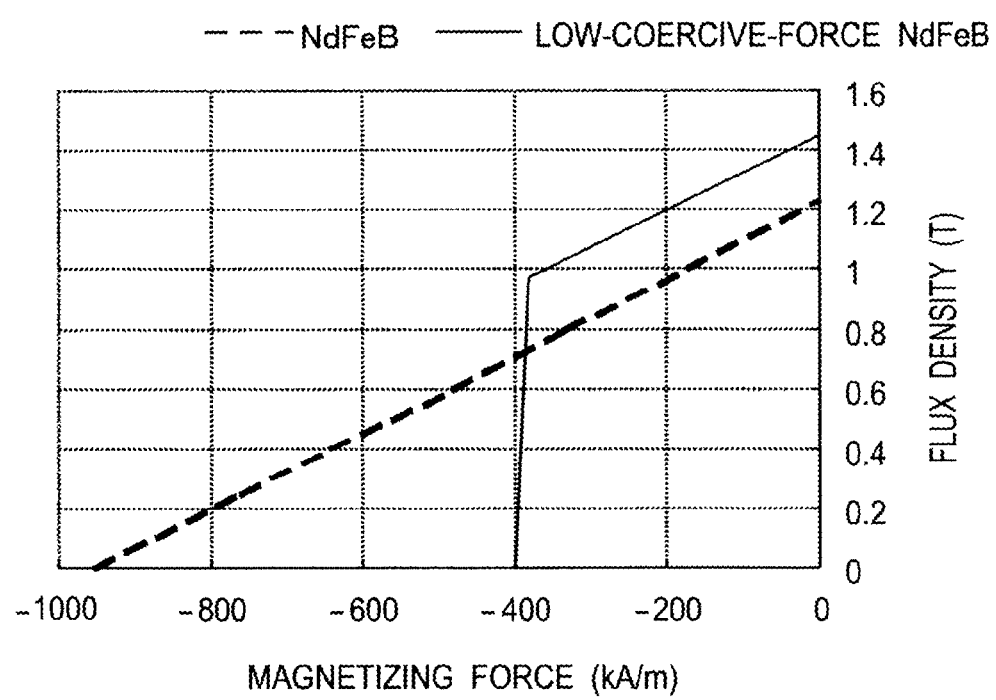
FIG. 14 illustrates magnetic characteristics of a standard NdFeB magnet and a low-coercive-force NdFeB magnet serving as a permanent magnet whose product of coercive force and thickness along magnetizing direction is small and which is adopted for a rotor of a permanent magnet rotating electrical machine according to a fourth embodiment of the present invention.

FIG. 14 illustrates characteristics of the low-coercive-force NdFeB magnet used as the permanent magnet 3 of the embodiment. A standard NdFeB magnet has a coercive force of 950 kA/m and the NdFeB magnet adopted by the embodiment has a coercive force of 400 kA/m.

The embodiment irreversibly changes the flux of the permanent magnet 3 by controlling irreversible demagnetization including that caused by temperature. When the Dy element or Tb element is reduced, the coercive force decreases to magnetize the NdFeB magnet with a reduced d-axis current.

Although the coercive force of the NdFeB magnet of the embodiment is small, the residual flux density thereof is high. The low-coercive-force NdFeB magnet having the magnetic characteristic illustrated in FIG. 14 has a coercive force of about 400 kA/m and a residual flux density of 1.45 T at 20° C. The low-coercive-force NdFeB magnet according to the embodiment provides a permanent magnet having a low coercive force and a small thickness along magnetizing direction, to increase an air gap flux density.

The permanent magnet rotating electrical machine according to the embodiment employs, as the permanent magnet 3, the NdFeB magnet having a low coercive force and a high residual flux density, so that the NdFeB magnet may increase an air gap flux density and provide high output. Since the adopted NdFeB magnet contains very little Dy element or Tb element that have little reserves, the magnet is stably manufacturable in years to come.

Fifth Embodiment

A permanent magnet rotating electrical machine according to the fifth embodiment of the present invention will be explained with reference to FIG. 15. The structure of a stator 20 of the embodiment is similar to that of the first embodiment illustrated in FIG. 1 or that of the related art illustrated in FIG. 20.

Figure 15:
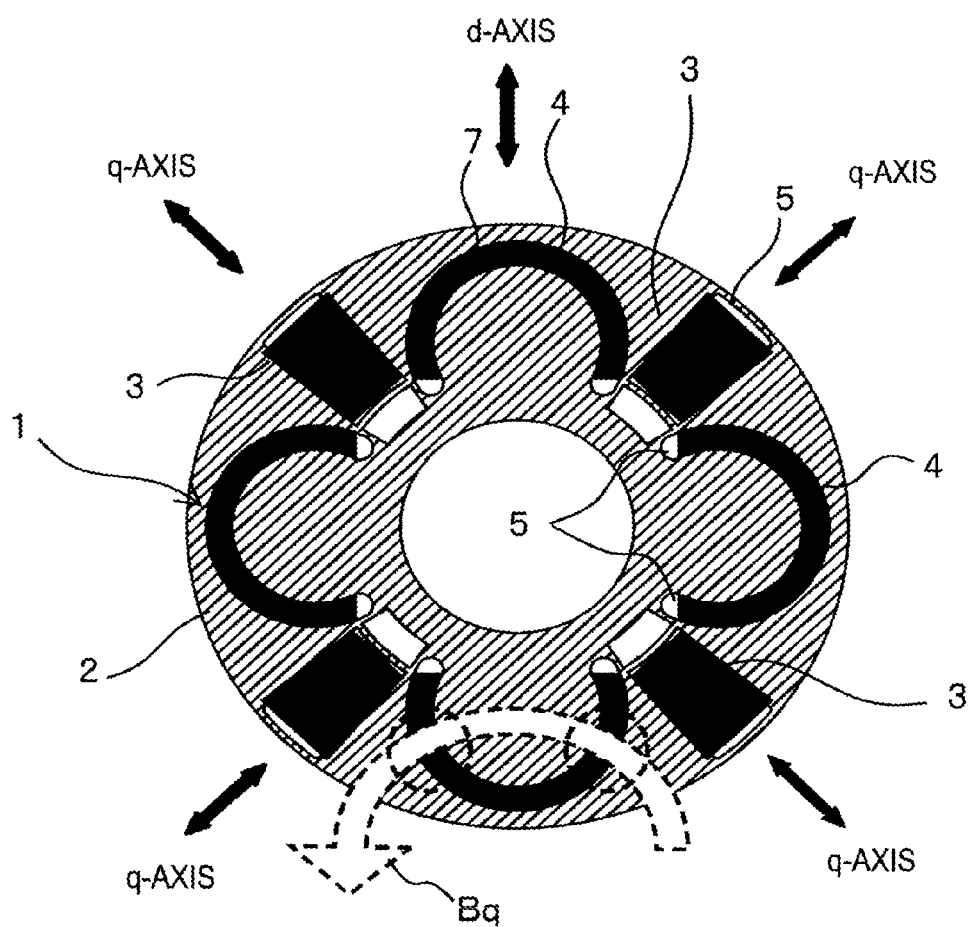
FIG. 15 is an explanatory view of a section of a rotor and q-axis flux in a permanent magnet rotating electrical machine according to a fifth embodiment of the present invention.

As illustrated in FIG. 15, the rotor 1 of this embodiment embeds NdFeB permanent magnets 4 in a rotor core 2, each NdFeB permanent magnet 4 having an inverted U-shape whose center axis is on a d-axis. Each alnico permanent magnet 3 is arranged inside the rotor core 2 along a q-axis in a diametrical direction. Arranging the NdFeB permanent magnet 4 of inverted U-shape on the d-axis serving as a center axis in the rotor core 2 increases magnetic resistance in a q-axis direction. Namely, the NdFeB permanent magnet 4 of inverted U-shape prevents q-axis flux created by an armature current, to reduce a q-axis inductance. Reducing the q-axis inductance lower than a d-axis inductance results in generating positive reluctance torque with a positive d-axis current.

When large torque is needed, the embodiment passes a positive d-axis current to suppress load-current demagnetization of each alnico permanent magnet 3 whose product of a coercive force and thickness is small. Linkage flux of the permanent magnets and magnet torque produced by the current are superposed by reluctance torque, to generate high torque.

The embodiment arranges the NdFeB permanent magnet 4 in an area sandwiched by two alnico permanent magnets 3, to extend a magnetic pole area. The NdFeB permanent magnet 4 has an inverted U-shape and the inverted U-shape NdFeB permanent magnet is arranged to block a magnetic path of q-axis flux, to reduce a q-axis inductance and improve power factor.

Sixth Embodiment

The sixth embodiment of the present invention will be explained with reference to FIG. 16. The structure of a rotor 20 of the embodiment is similar to that of the first embodiment illustrated in FIG. 1 or that of the related art illustrated in FIG. 20.

Figure 16:
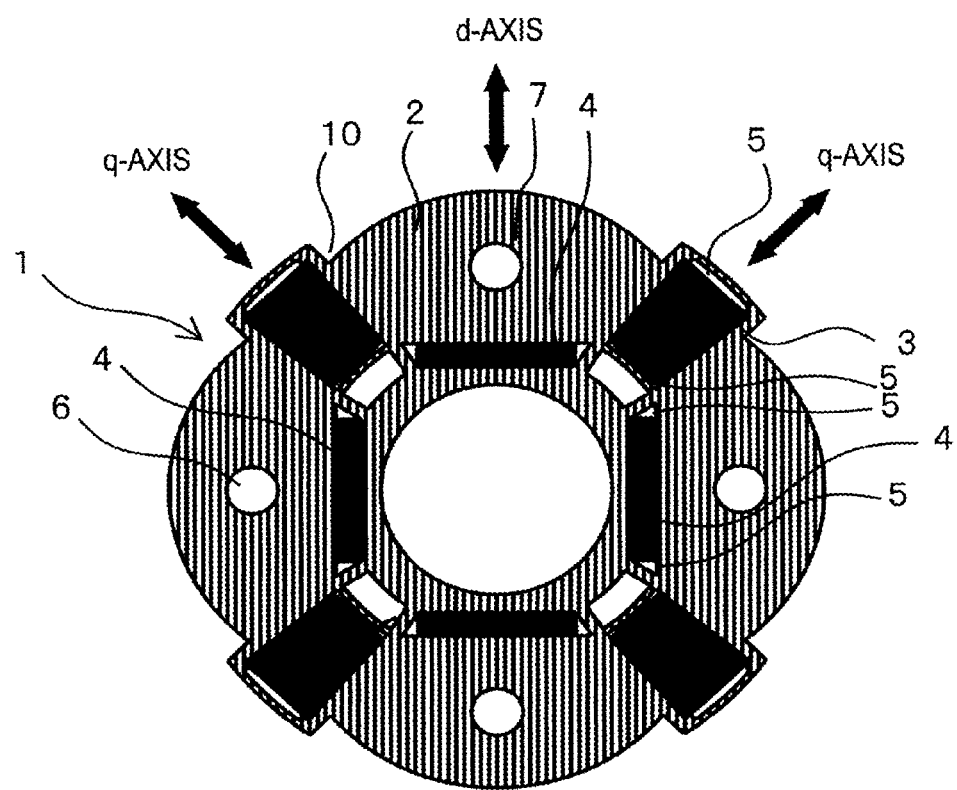
FIG. 16 is a sectional view of a rotor in a permanent magnet rotating electrical machine according to a sixth embodiment of the present invention.

As illustrated in FIG. 16, a rotor 1 of this embodiment arranges alnico permanent magnets 3 inside a rotor core 2 in a radial direction of the rotor 1 that agrees with a q-axis serving as an inter-pole center axis. Except for a part of the rotor core 2 at each end of the alnico permanent magnet 3, an outermost circumference of the rotor core 2 around the q-axis on an air gap 23 side is recessed, to form recesses 10.

Action of the permanent magnet rotating electrical machine of the embodiment will be explained. Flux (d-axis flux) created by a d-axis current crosses the alnico and NdFeB magnets 3 and 4. The magnetic permeability of the permanent magnets is substantially equal to that of air, and therefore, a d-axis inductance is small. On the other hand, flux in a q-axis direction passes through a magnetic pole portion 7 of the rotor core 2 in longitudinal directions of the alnico and NdFeB permanent magnets 3 and 4. The magnetic permeability of the magnetic pole portion 7 of the rotor core 2 is 1000 to 10000 times as large as that of the permanent magnets. If the q-axis part of the rotor core 2 has no recess 10 and if the outer diameter of the rotor core 2 is circumferentially uniform, a q-axis inductance will be large. A q-axis current must be passed to produce magnetic action and flux to generate torque. At this time, the large q-axis inductance increases a voltage generated by the q-axis current. Namely, the large q-axis inductance deteriorates a power factor. When a positive d-axis current is passed, negative reluctance torque is generated to deteriorate total torque that is the sum of magnet torque produced by linkage flux of the permanent magnets and current and the reluctance torque.

To cope with this, the embodiment recesses the outermost circumference of the rotor core 2 around the q-axis on the air gap side, to form the recesses 10 that decrease flux passing through the recesses 10. Since the recesses 10 are present in the q-axis direction, they can reduce the q-axis inductance. This results in improving the power factor. Since the recesses 10 decrease the q-axis inductance, negative reluctance torque caused when a positive d-axis current is passed decreases. When the recesses 10 are enlarged to decrease the q-axis inductance lower than the d-axis inductance, a positive d-axis current creates positive reluctance torque to increase total torque that is the sum of magnet torque and reluctance torque. Each recess 10 equivalently elongates an air gap length around each end of the alnico permanent magnet 3, to lower an average magnetic field around the end of the alnico permanent magnet 3. This results in reducing the influence of a demagnetizing field on the alnico permanent magnet 3 due to the q-axis current for generating torque.

According to the embodiment, between the end of the alnico permanent magnet 3 and the middle of the magnetic pole portion 7 of the rotor core 2, the middle of the magnetic pole portion 7 on the d-axis defines an outermost peripheral part. The distance between the axial center of the rotor 1 and the outer circumference of the rotor core 2 decreases from the middle of the magnetic pole portion 7 toward the end of the alnico permanent magnet 3 on the outer circumferential side of the rotor core 2 (i.e., the outer diameter of the core portion at the outer circumference of the end of the alnico magnet 3 is shorter than the outer diameter of the core portion on the d-axis). This shape of the rotor 1 can reduce the q-axis inductance like the case mentioned above, to improve power factor and increase total torque when a positive d-axis current is passed. In addition, the recesses 10 smoothly incline along the outer circumference of the rotor 1, to reduce harmonic flux, torque ripple, and cogging torque.

According to the embodiment, the recess 10 may be replaced with a hollow that is formed at an outer circumferential part of the rotor in the vicinity of the q-axis. This configuration can also reduce the q-axis inductance and provide the same action and effect.

Although each of the above-mentioned embodiments relates to a four-pole rotating electrical machine, the technical idea of the present invention is also applicable to multipole rotating electrical machines such as eight-pole rotating electrical machines. Depending on the number of poles, the arrangements, positions, and shapes of permanent magnets must more or less be changed. However, they provide similar actions and effects.

Permanent magnets that form magnetic poles are each defined according to the product of coercive force and thickness along magnetizing direction. Accordingly, the same actions and effects will be obtained by forming each magnetic pole with permanent magnets of the same kind having different thicknesses along magnetizing direction.

Seventh Embodiment

Figure 17:
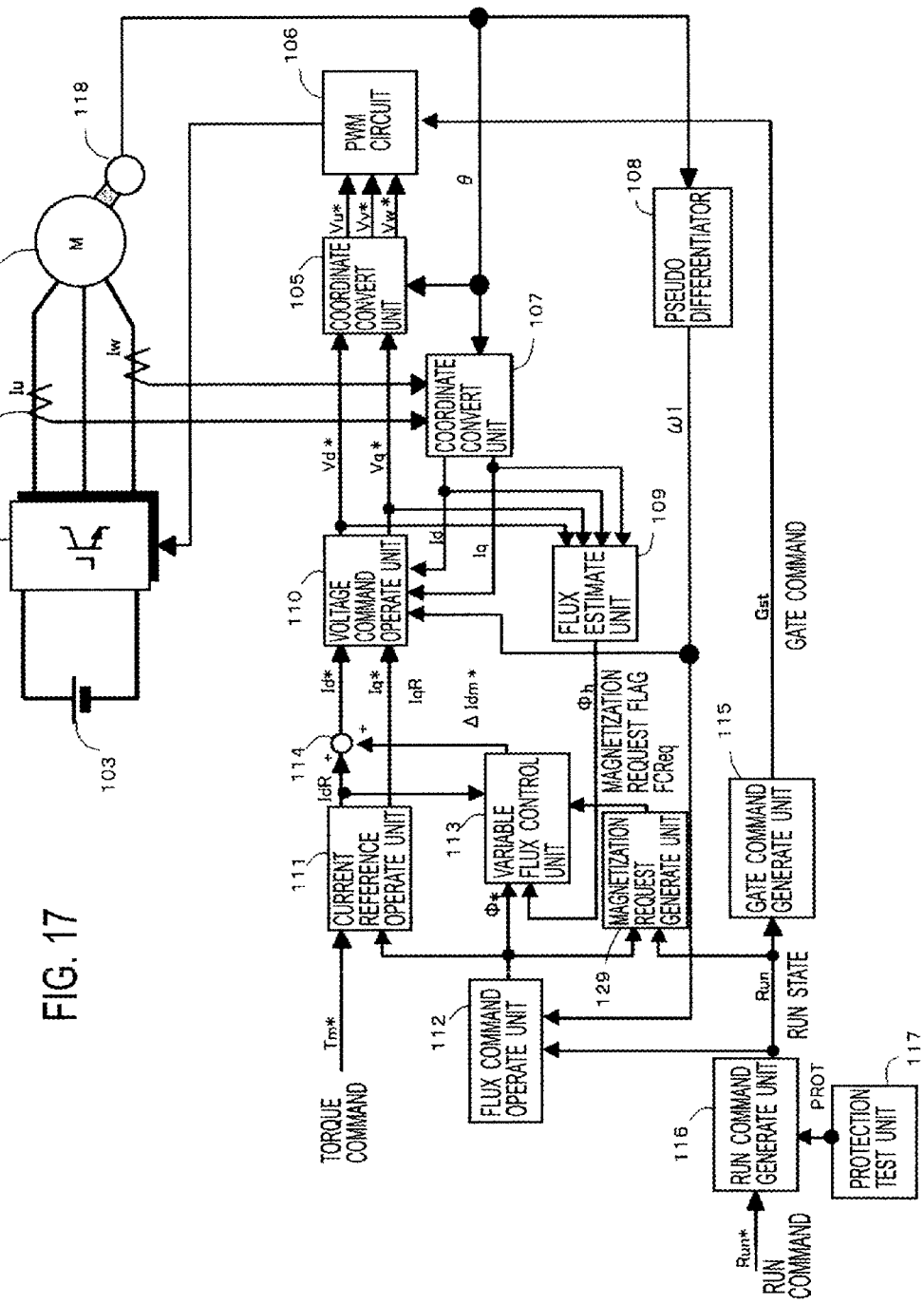
FIG. 17 is a block diagram of a permanent magnet motor drive system according to a seventh embodiment of the present invention.

A permanent magnet motor drive system 200 according to the seventh embodiment of the present invention will be explained with reference to FIGS. 17 to 19. The permanent magnet motor drive system of this embodiment is usable in place of the drive system of the above-mentioned first embodiment, to drive and control the permanent magnet rotating electrical machines of the first to sixth embodiments. In FIG. 17, parts common to the first embodiment illustrated in FIG. 7 are represented with the same reference marks.

The variable-flux permanent magnet motor drive system 200 according to the embodiment differs from the first embodiment illustrated in FIG. 7 in that a flux estimate unit 109 is additionally arranged to estimate a flux Φh with the use of voltage commands Vd* and Vq* from a voltage command operate unit 110, d- and q-axis currents Id and Iq from a coordinate convert unit 107, and a rotor rotational angle frequency ω1 and output the estimated flux to a variable flux control unit 113. In addition, the variable flux control unit 113 has a configuration illustrated in FIG. 18.

The flux estimate unit 109 uses the d- and q-axis voltage commands Vd* and Vq*, d- and q-axis currents Id and Iq, and rotor rotational angle frequency ω1 (inverter frequency), to estimate the d-axis flux amount as follows:

[Math. 7]

$$\Phi h = (Vq^* - R1 \times Iq - \Phi 1 \times Ld \times Id - Lq \times dIq/dt)/\omega 1 \qquad (10)$$

The estimated flux value Φh and a flux command Φ* from a flux command operate unit 112 are input to the variable flux control unit 113.

Figure 18:
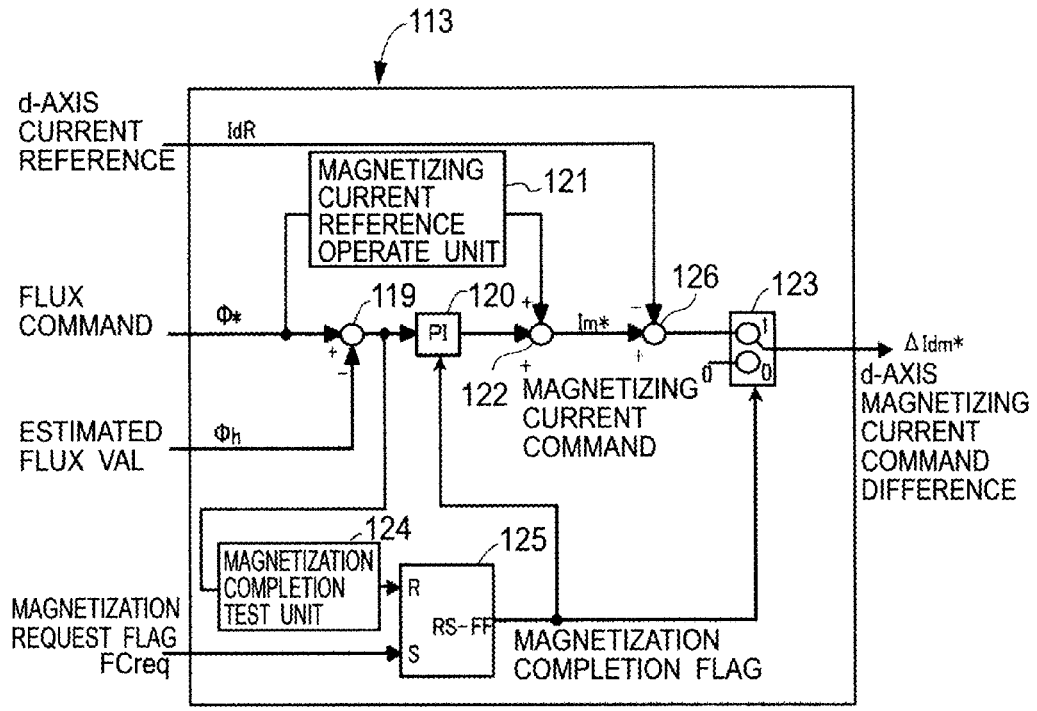
FIG. 18 is a block diagram illustrating an internal structure of a variable flux control unit in the permanent magnet motor drive system according to the above-mentioned embodiment.

A detailed configuration of the variable flux control unit 113 of this embodiment is illustrated in FIG. 18. A subtracter 119 calculates a deviation between the flux command Φ* and the estimated flux value Φh and supplies the deviation to a PI control unit 120. The flux command Φ* is input to a magnetizing current reference operate unit 121. The magnetizing current reference operate unit 121 calculates a magnetizing current command Im* with the use of a table or a functional equation, so that magnetization is carried out to realize flux corresponding to the flux command Φ*. This characteristic is calculated according to the above-mentioned BH characteristic. An adder 122 adds an output from the magnetizing current reference operate unit 121 to an output from the PI control unit 120.

The adder 122 provides the magnetizing current command Im*. For magnetization, the magnetizing current command Im* is applied as a d-axis current command Id*. To make Id* and Im* agree with each other, the embodiment uses a subtracter 126 to subtract a d-axis current reference IdR from the magnetizing current command Im* and provide a d-axis magnetizing current command difference ΔIdm*. This difference is added to the d-axis current reference IdR by an adder 114, and therefore, the d-axis current command Id* agrees with the magnetizing current command Im*.

A switch 123 in the variable flux control unit 113 selects one of two inputs according to a magnetization completion flag to be explained later and outputs the magnetizing current command Idm*. If the magnetization completion flag is 0 (magnetization completed), the d-axis magnetizing current command difference ΔIdm* is set to zero. If the magnetization completion flag is 1 (in magnetization), the output of the adder 122 is provided as ΔIdm*.

The deviation between the flux command Φ* and the estimated flux value Φh is also supplied from the subtracter 119 to a magnetization completion test unit 124. The magnetization completion test unit 124 provides 1 if the absolute value of the flux deviation is smaller than a predetermined value α, and if it is greater than α, provides 0. A flip-flop (RS-FF) 125 receives a magnetization request flag FCreq at a set terminal S and the output from the magnetization completion test unit 124 at a reset terminal R. An output from the RS-FF 125 is the magnetization completion flag, which is input to the PI control unit 120 and switch 123. If the magnetization completion flag is 0, it indicates that magnetization has been completed, and if 1, it indicates that magnetization is in progress.

The estimated flux value Φh from the flux estimate unit 109 is also input to a current reference operate unit 111. The current reference operate unit 111 uses the estimated flux value Φh, instead of the flux command Φ* used by the expression of the first embodiment, and calculates B- and q-axis current references IdR and IqR as follows:

[Math. 8]

$$IqR = (-\Phi h + \sqrt{\Phi h^2 - 4 \times (Ld - Lq) \times K \times Tm^*})/2 \times (Ld - Lq) \times K \qquad (11)$$

$$IdR = K \times IqR \qquad (12)$$

With the above-mentioned configuration, this embodiment provides actions and effects mentioned below. If there is a magnetization request, the magnetization request flag rises to 1 at least momentarily. The RS-FF 125 is then set to provide the magnetization completion flag of 1 to indicate that magnetization is in progress. The switch 123 provides the magnetizing current command Im* based on the outputs from the PI control unit 120 and magnetizing current reference operate unit 121. The magnetizing current reference operate unit 121 provides, in a feed-forward manner, a magnetizing current based on a beforehand grasped BH characteristic so as to achieve the flux command Φ*. This results in instantaneously carrying out magnetization up to nearly the command value. Since the duration of magnetization is shortened, the generation of unnecessary torque or loss can be suppressed. The BH characteristic may be obtained beforehand through tests.

As mentioned above, it is difficult to precisely make flux agree with a specified value. Accordingly, this embodiment corrects the magnetizing current Im* as illustrated in FIG. 19 so that the flux deviation approaches 0 due to the action of the PI control unit 120 in the variable flux control unit 113. In the last stage, this makes the flux command Φ* and estimated flux value Φh (i.e., actual flux if there is no estimation error) agree with each other. This improves a flux amount repetition accuracy in a magnetization process and increases a torque accuracy.

Figure 19:
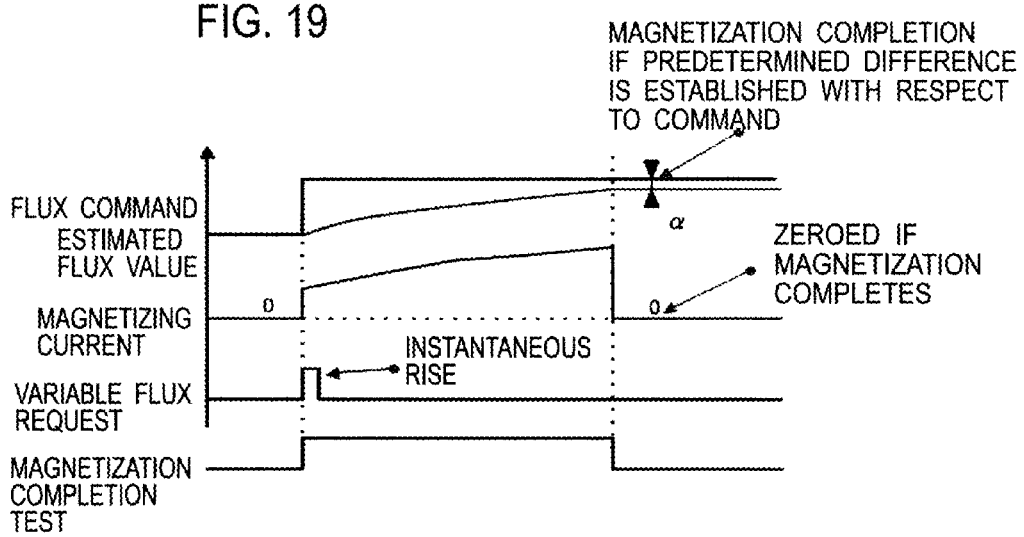
FIG. 19 is a timing chart of motor control by the permanent magnet motor drive system according to the above-mentioned embodiment.

According to this embodiment, the magnetization completion test unit 124 in the variable flux control unit 113 outputs 1 if the absolute value of the flux deviation comes in the predetermined range α as illustrated in FIG. 19, to indicate that a specified flux amount has actually been attained and magnetization has been completed. In response to the reset request, the RS-FF 125 provides the magnetization completion flag of 0. In this way, when the estimated flux value agrees with the flux command Φ*, the magnetization process is terminated. As a result, this embodiment improves a flux amount repetition accuracy in a magnetization process and increases a torque accuracy.

According to this embodiment, the d- and q-axis current references IdR and IqR are generated with the use of the estimated flux value Φh estimated from voltages and currents, and therefore, d- and q-axis current commands are corrected according to actual conditions even if a flux amount varies due to a magnetization process. Since d- and q-axis currents are passed according to the d- and q-axis current commands, an influence of flux amount variation on torque can be reduced and a torque accuracy can be improved.

This embodiment is based on an estimated flux value. The estimated flux value includes motor inductances such as Ld and Lq. These values vary according to magnetic saturation. In particular, the variable-flux motor changes its magnetic saturation depending on a variable flux amount. It is, therefore, advantageous for improving a flux estimation accuracy and torque accuracy to employ a function or table that receives an estimated value of variable flux and outputs a motor inductance.

Even if such a table is prepared, it is sometimes difficult to correctly grasp inductance characteristics. In this case, the flux estimation may be replaced with a flux detector consisting of Hall elements and the like to detect an actual flux value Φr and use the same in place of the estimated flux value Φh. This will further improve a flux estimation accuracy and torque accuracy.

The invention claimed is:

1. A permanent magnet motor drive system comprising:
a permanent magnet motor employing permanent magnets;
an inverter to drive the permanent magnet motor; and
a magnetize means to pass a magnetizing current for controlling flux of the permanent magnets,
wherein:
the permanent magnet motor employs two or more kinds of permanent magnets having different shapes or different magnetic characteristics, to form a magnetic pole, a plurality of the magnetic poles forming a rotor; and
the magnetize means passes for a short time a d-axis current through an armature coil of the permanent magnet motor, to generate a magnetic field to magnetize at least a permanent magnet of one kind at each magnetic pole and irreversibly change a flux amount of the permanent magnet and changes a current phase of an armature coil current, to pass a magnetizing current, and passes a d-axis current through the armature coil in a direction for strengthening a magnetic flux of the permanent magnet of which magnetic flux is irreversibly changed when torque is generated and when a torque command is equal to or higher than a predetermined value.

2. The permanent magnet motor drive system as set forth in claim 1, wherein the magnetize means employs a magnetic field that is generated by passing a d-axis current to the armature coil for a short time, to magnetize at least a permanent magnet of one kind at each magnetic pole and reverse the polarity of the permanent magnet.

3. The permanent magnet motor drive system as set forth in claim 1, wherein the magnetize means employs a magnetic field that is generated by passing a d-axis current to the armature coil for a short time, to magnetize at least a permanent magnet of one kind at each magnetic pole, irreversibly change a flux amount of the permanent magnet, and nearly zero a linkage flux amount of the armature coil derived from all permanent magnets.

4. The permanent magnet motor drive system as set forth in claim 1, wherein the magnetize means employs a magnetic field that is generated by passing a d-axis current to the armature coil for a short time, to partly magnetize the permanent magnets or reverse the polarity of the permanent magnets and control an increase or a decrease in a linkage flux amount of the permanent magnets.

5. The permanent magnet motor drive system as set forth in claim 1, wherein the magnetize means employs a magnetic field that is generated by passing a d-axis current to the armature coil for a short time, to irreversibly change a flux amount of or reverse the polarity of the permanent magnet whose product of coercive force and thickness along magnetizing direction is smaller than that of the other permanent magnet.

6. The permanent magnet motor drive system as set forth in claim 1, wherein the magnetize means employs a magnetic field that is generated by passing a d-axis current to the armature coil for a short time, to magnetize the permanent magnet and irreversibly change a flux amount of or reverse the polarity of the permanent magnet and passes a q-axis current to control torque.

7. The permanent magnet motor drive system as set forth in claim 1, wherein the magnetize means, when the permanent magnet motor operates around maximum torque or rated torque, magnetizes the permanent magnet whose product of coercive force and thickness along magnetizing direction is smaller than that of the other so as to make linkage flux of the permanent magnets at each magnetic pole additive, and when the permanent magnet motor operates under light load with small torque or in a middle- or high-speed zone, magnetizes the permanent magnet whose product of coercive force and thickness along magnetizing direction is smaller than that of the other with a magnetic field created by a current, so as to irreversibly reduce the linkage flux or reverse the polarity of the permanent magnet with the magnetic field.

8. The permanent magnet motor drive system as set forth in claim 1, wherein the magnetize means employs a magnetic field that is generated by passing a d-axis current to the armature coil for a short time, to magnetize at least a permanent magnet of one kind at each magnetic pole and irreversibly change a flux amount of the permanent magnet, and under light load with small torque or in a middle- or high-speed zone, passes a negative d-axis current to the armature coil in addition to the irreversible change of the flux of the permanent magnet.

9. The permanent magnet motor drive system as set forth in claim 1, wherein a d-axis inductance is larger than a q-axis inductance.

* * * * *